March 24, 1959 W. JACKSON 2,878,763

TUFTING MACHINE

Filed June 25, 1954 15 Sheets-Sheet 1

INVENTOR.
WILBUR JACKSON

BY B P Fishburne

ATTORNEY

INVENTOR.
WILBUR JACKSON
BY [signature]
ATTORNEY

March 24, 1959 W. JACKSON 2,878,763

TUFTING MACHINE

Filed June 25, 1954 15 Sheets-Sheet 3

INVENTOR.
WILBUR JACKSON

BY

ATTORNEY

March 24, 1959 W. JACKSON 2,878,763

TUFTING MACHINE

Filed June 25, 1954 15 Sheets-Sheet 4

INVENTOR.
WILBUR JACKSON

BY [signature]

ATTORNEY

March 24, 1959 W. JACKSON 2,878,763

TUFTING MACHINE

Filed June 25, 1954 15 Sheets-Sheet 5

INVENTOR.
WILBUR JACKSON

BY [signature]

ATTORNEY

March 24, 1959 W. JACKSON 2,878,763

TUFTING MACHINE

Filed June 25, 1954 15 Sheets-Sheet 6

INVENTOR.
WILBUR JACKSON

BY [signature]

ATTORNEY

March 24, 1959 W. JACKSON 2,878,763

TUFTING MACHINE

Filed June 25, 1954 15 Sheets-Sheet 7

INVENTOR.
WILBUR JACKSON
BY [signature]
ATTORNEY

March 24, 1959 W. JACKSON 2,878,763

TUFTING MACHINE

Filed June 25, 1954 15 Sheets-Sheet 8

INVENTOR.
WILBUR JACKSON
BY [signature]
ATTORNEY

March 24, 1959 W. JACKSON 2,878,763

TUFTING MACHINE

Filed June 25, 1954 15 Sheets-Sheet 9

INVENTOR.
WILBUR JACKSON
BY [signature]
ATTORNEY

March 24, 1959 W. JACKSON 2,878,763

TUFTING MACHINE

Filed June 25, 1954 15 Sheets-Sheet 10

INVENTOR.
WILBUR JACKSON
BY
ATTORNEY

INVENTOR.
WILBUR JACKSON
BY
ATTORNEY

March 24, 1959 W. JACKSON 2,878,763

TUFTING MACHINE

Filed June 25, 1954 15 Sheets-Sheet 12

INVENTOR
WILBUR JACKSON

BY [signature]

ATTORNEY

March 24, 1959 W. JACKSON 2,878,763

TUFTING MACHINE

Filed June 25, 1954 15 Sheets-Sheet 13

INVENTOR
WILBUR JACKSON

BY [signature]

ATTORNEY

March 24, 1959 W. JACKSON 2,878,763

TUFTING MACHINE

Filed June 25, 1954 15 Sheets-Sheet 14

INVENTOR.
WILBUR JACKSON

BY

ATTORNEY

March 24, 1959 W. JACKSON 2,878,763

TUFTING MACHINE

Filed June 25, 1954 15 Sheets-Sheet 15

INVENTOR.
WILBUR JACKSON

BY [signature]

ATTORNEY

United States Patent Office 2,878,763 Patented Mar. 24, 1959

2,878,763

TUFTING MACHINE

Wilbur Jackson, Chatsworth, Ga.

Application June 25, 1954, Serial No. 439,202

25 Claims. (Cl. 112—79)

My invention relates to tufting machines.

An important object of the invention is to provide a machine of the above-mentioned character for producing long and short tufted portions.

A further object of the invention is to provide a machine of the above-mentioned character which will produce a tufted article having a desired design, and which design may be widely varied.

A further object of the invention is to provide a machine of the above-mentioned character which will tuft the border of a rug or the like in a uniform pile length and also tuft the field of the same in portions of different pile lengths for producing the desired design.

A further object of the invention is to provide a machine of the above-mentioned character which is adjustable to vary the lengths of the piles for producing a desired design, or may be operated to provide a pile length which is uniform throughout the entire area of the product being tufted.

A further object of the invention is to provide means to vary the tension upon the yarn being fed to the needle during the sewing operation, which tension pulls back a portion of the formed loop or tuft, to shorten the same.

A further object of the invention is to provide means to vary the degree of tension placed upon the yarn, so that the degree of pull back of the formed loop or tuft may in turn be varied.

A further object of the invention is to provide a machine of the above-mentioned character which is continuous and rapid in operation, and automatic in such operation.

Other objects and advantages of the invention will be apparent during the course of the following description.

In the accompanying drawings forming a part of this application and in which like numerals are employed to designate like parts throughout same, Figure 1 is a rear side elevation of a tufting machine embodying my invention.

Figure 1:
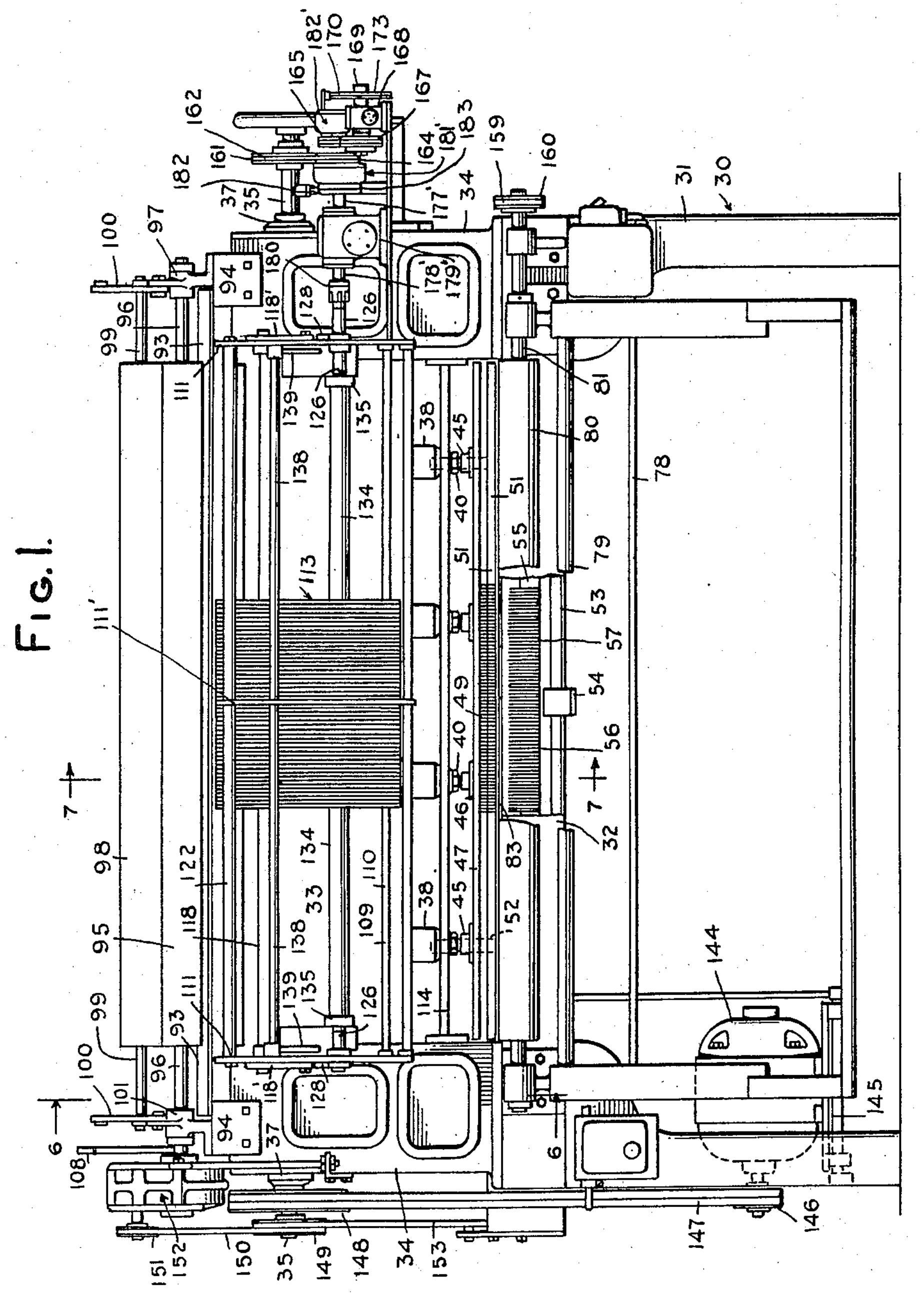
Figure 5:
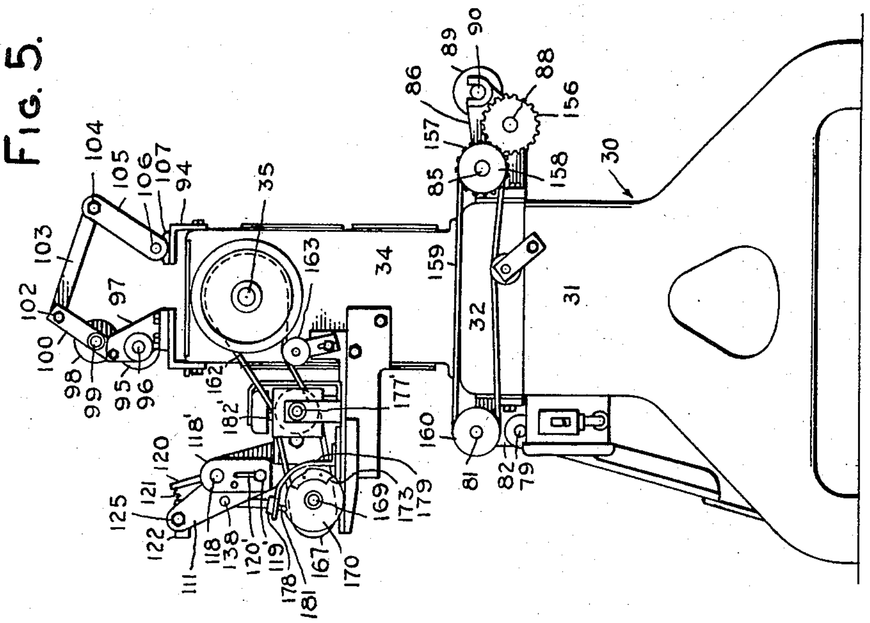
Figure 4:
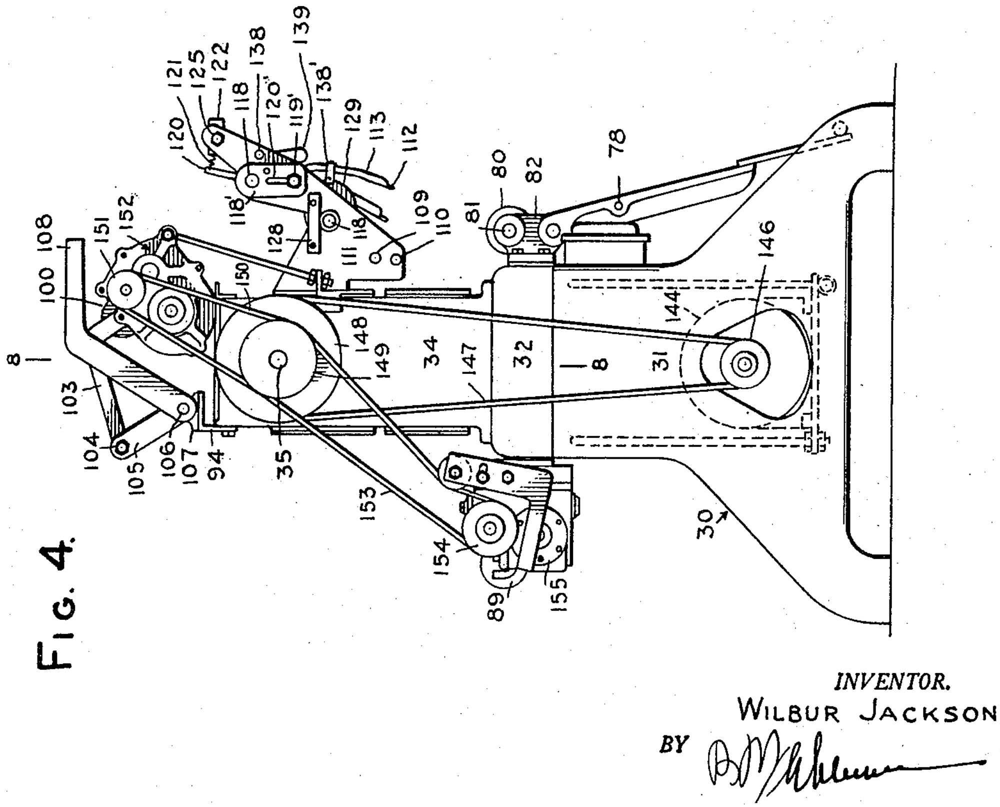
Figures 6, 6A, 6B:
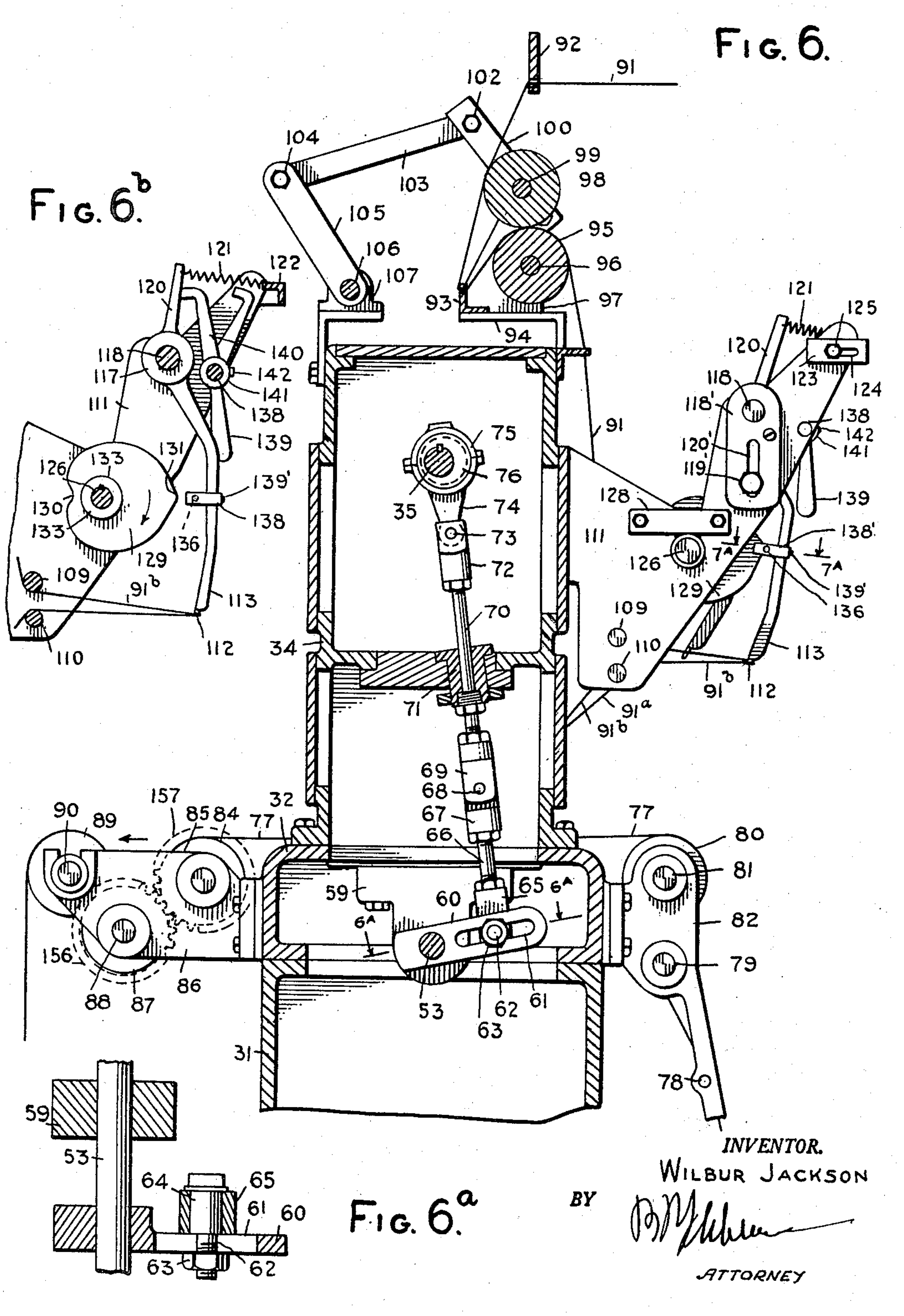
Figures 7, 7A, 7B, 7C, 7D:
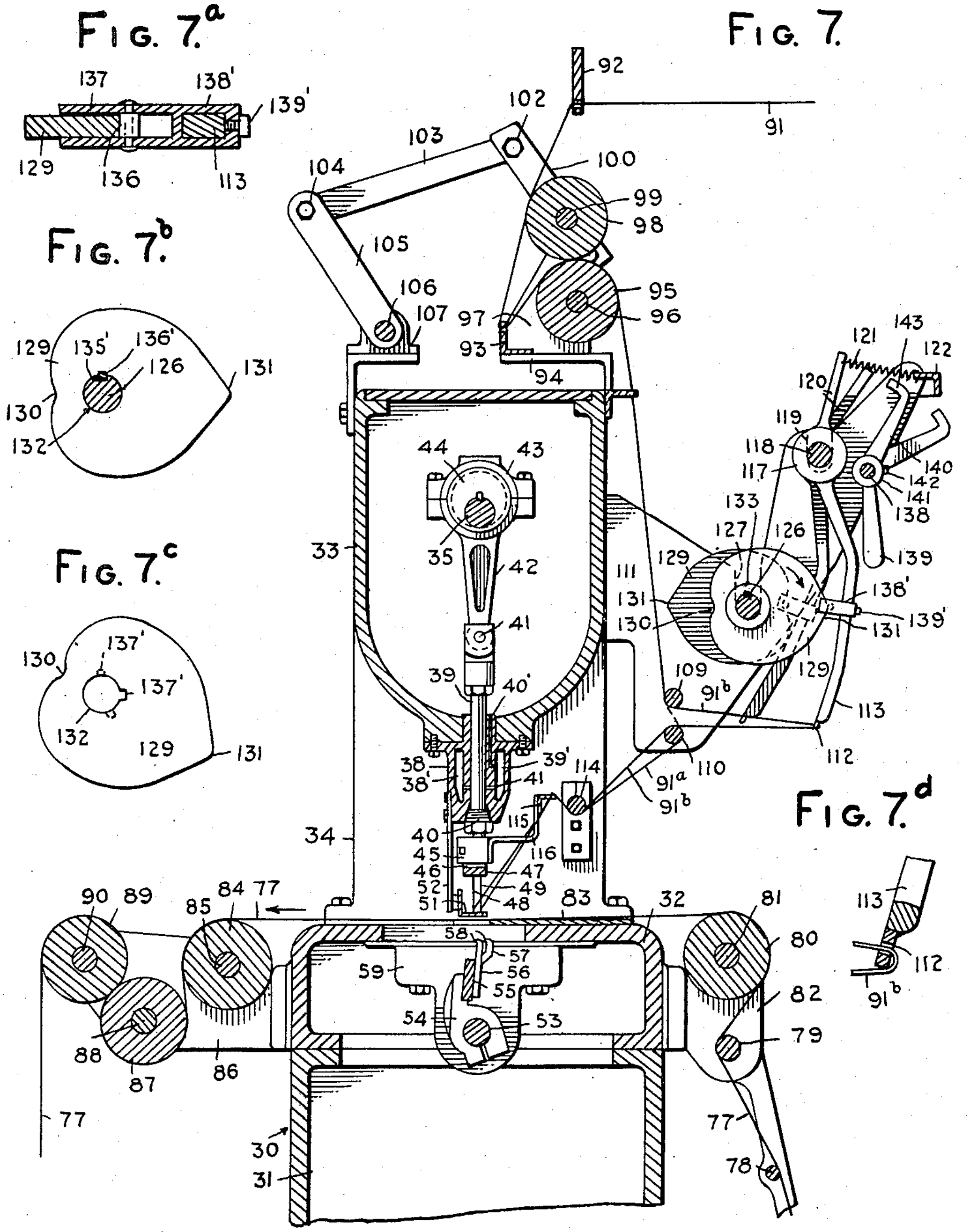
Figure 8:
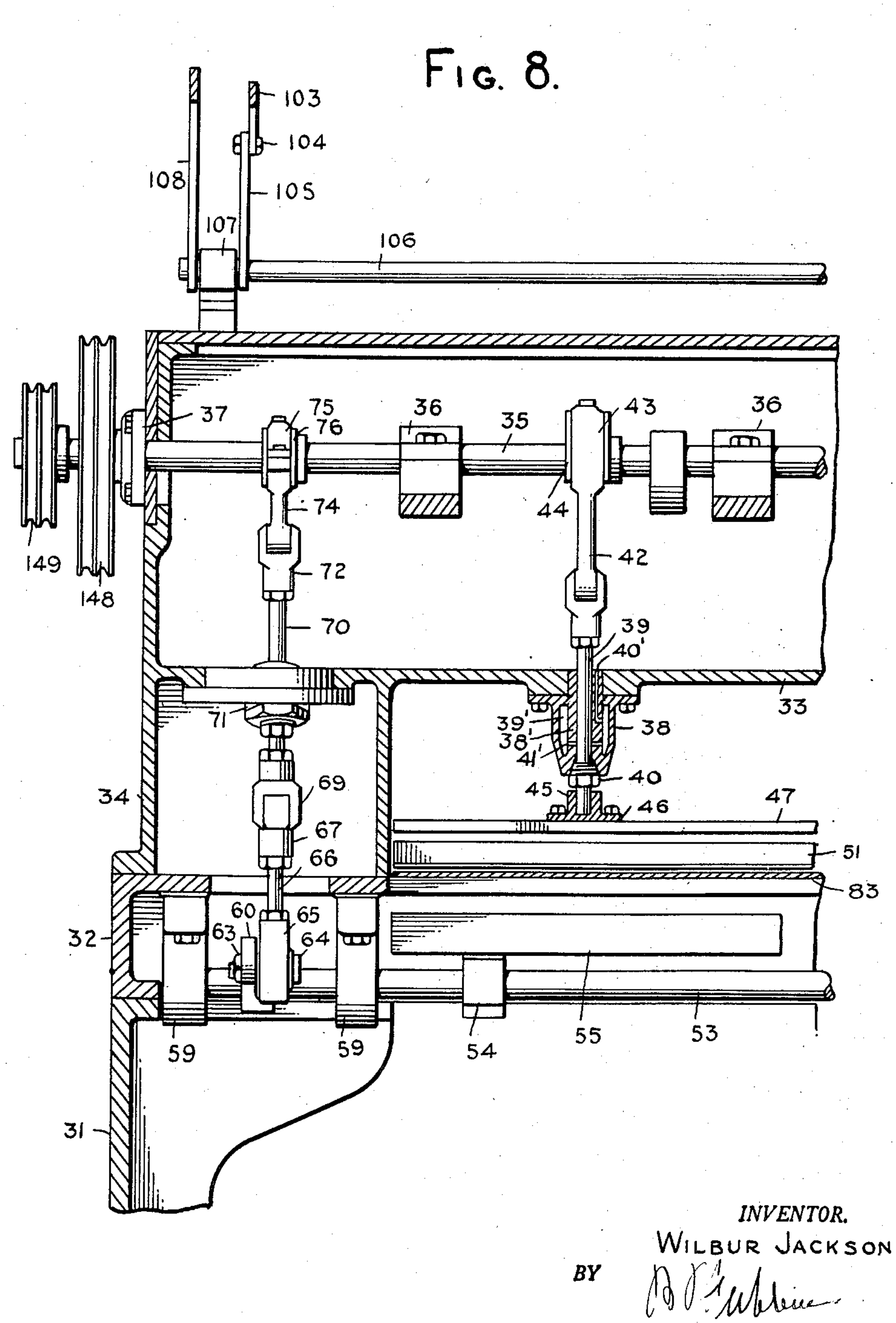
Figure 10:
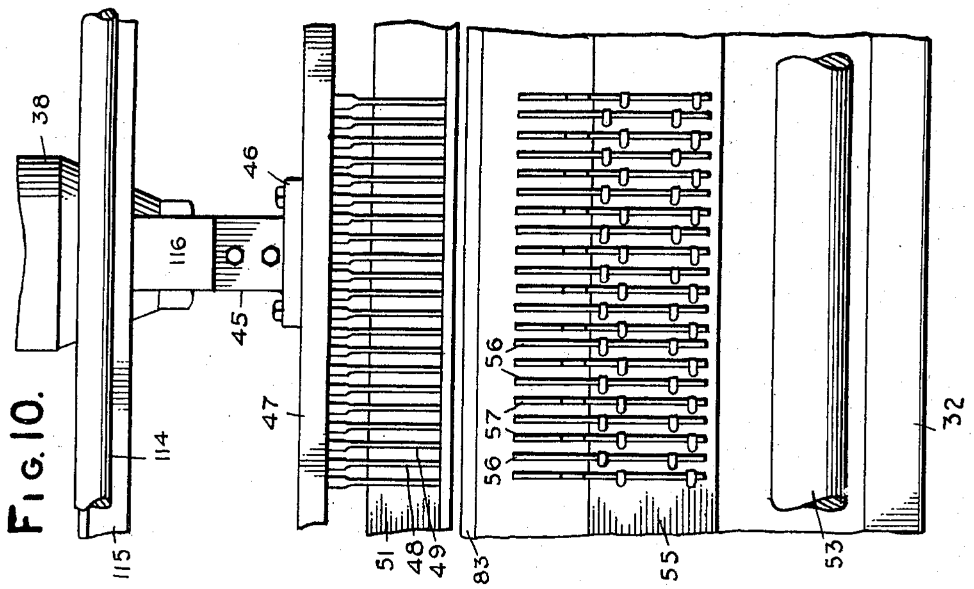
Figures 9, 9A, 10A:
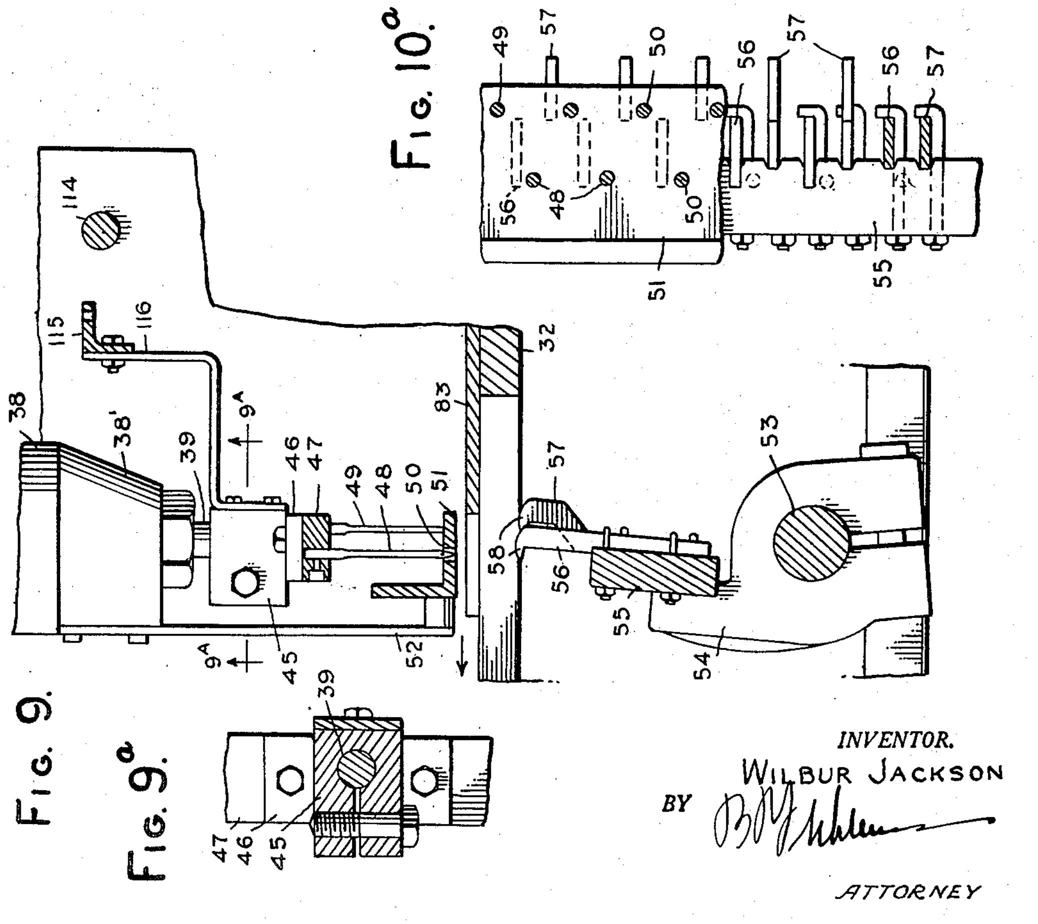

Figure 4 is an end elevation of the machine, viewed from the left end, Figure 1, Figure 5 is an elevation of the opposite end of the machine, Figure 6 is a transverse vertical section taken on line 6—6 of Figure 1, Figure 6*a* is a horizontal section taken on line *6a—6a* of Figure 6, parts in elevation, Figure 6*b* is a side elevation of one pull back lever and associated elements, showing such lever held in the inactive position, Figure 7 is a vertical transverse section taken on line 7—7 of Figure 1, Figure 7*a* is a horizontal section taken on line *7a—7a* of Figure 6, Figure 7*b* is a side elevation of one of the main cams, illustrating one manner of adjustably mounting the same upon the cam shaft, Figure 7*c* is a side elevation of the main cam, illustrating a further means to adjustably mount the same upon the cam shaft, Figure 7*d* is a detailed section through one end of the pull back lever, Figure 8 is a longitudinal vertical section taken on line 8—8 of Figure 4, parts broken away, Figure 9 is a section similar to Figure 7, upon an enlarged scale, further illustrating the needles and loopers, parts broken away.

Figures 11, 12:
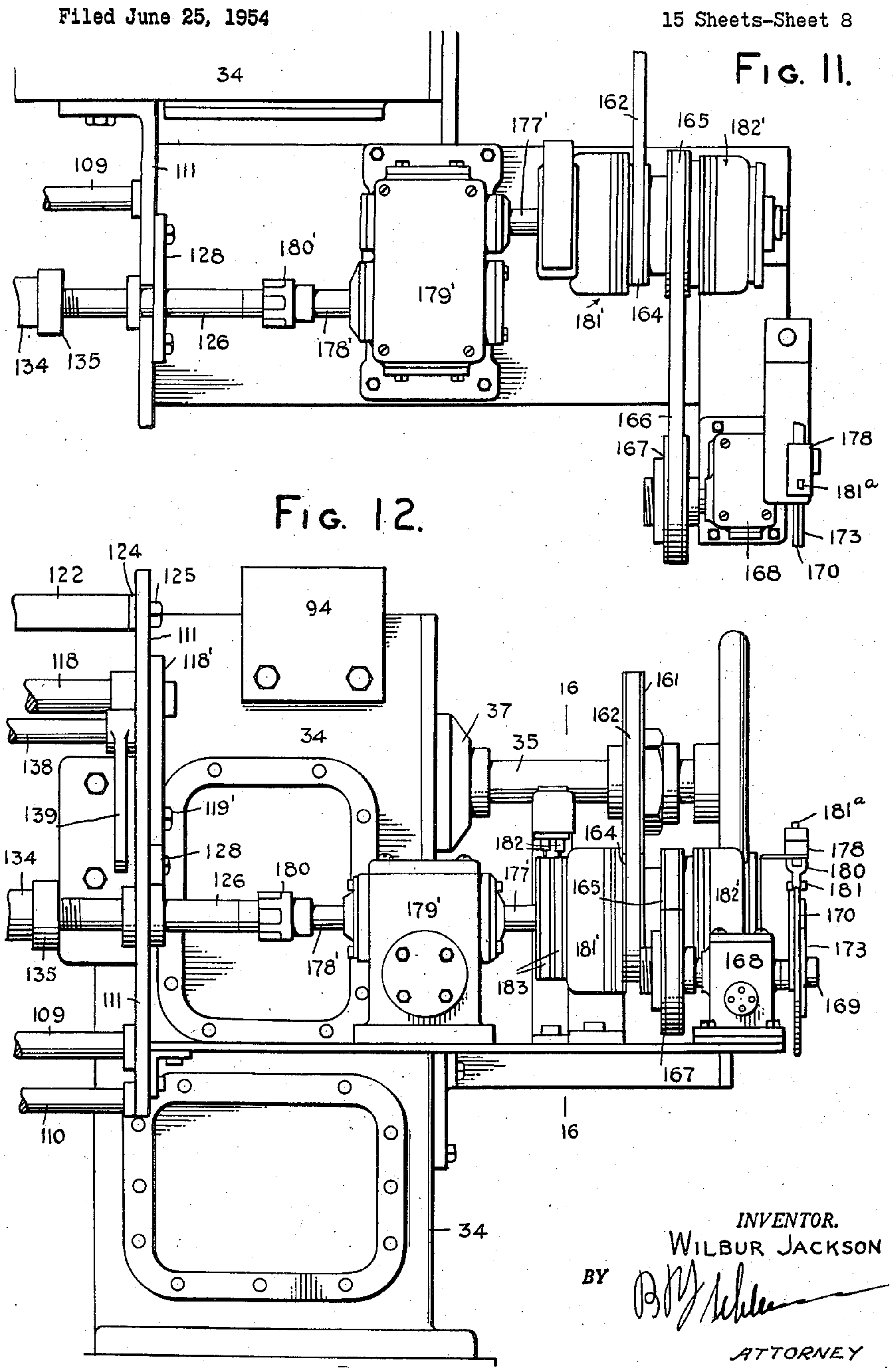
Figure 13:
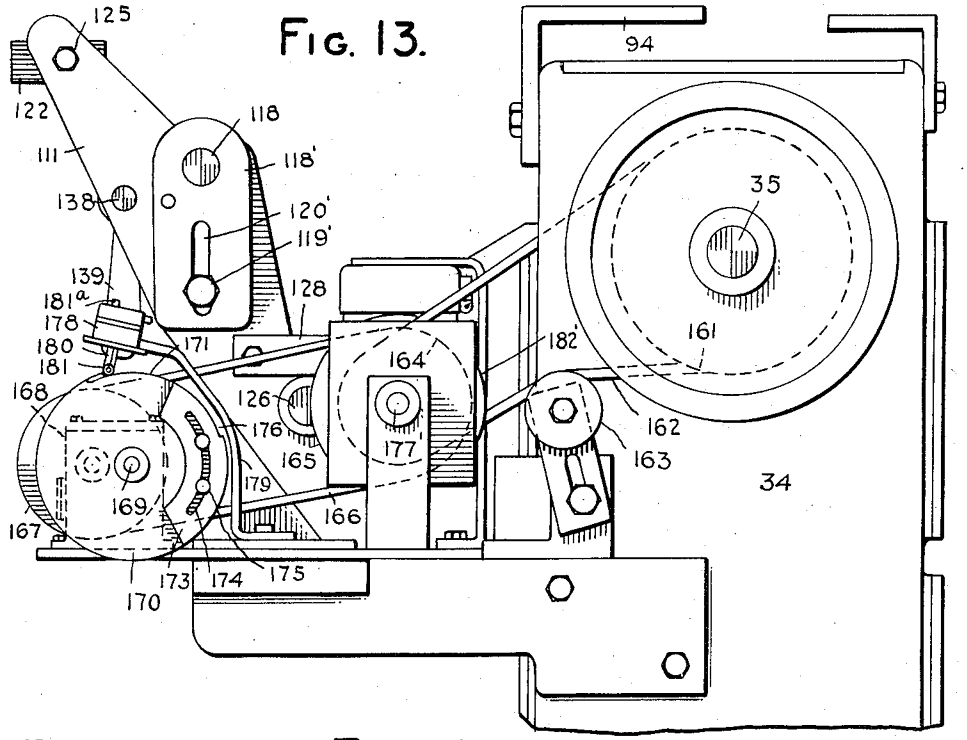
Figures 14, 14A, 15:
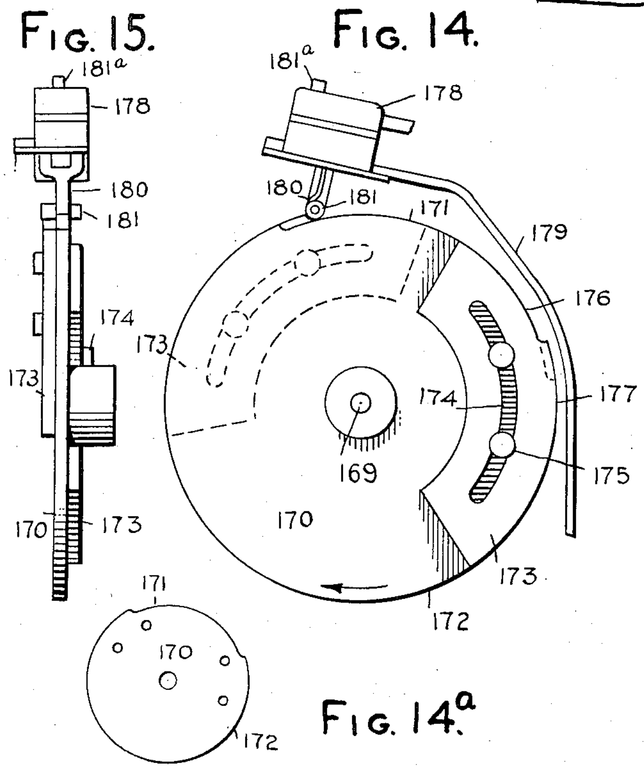
Figure 16:
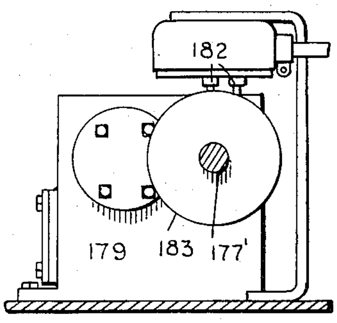
Figure 17:
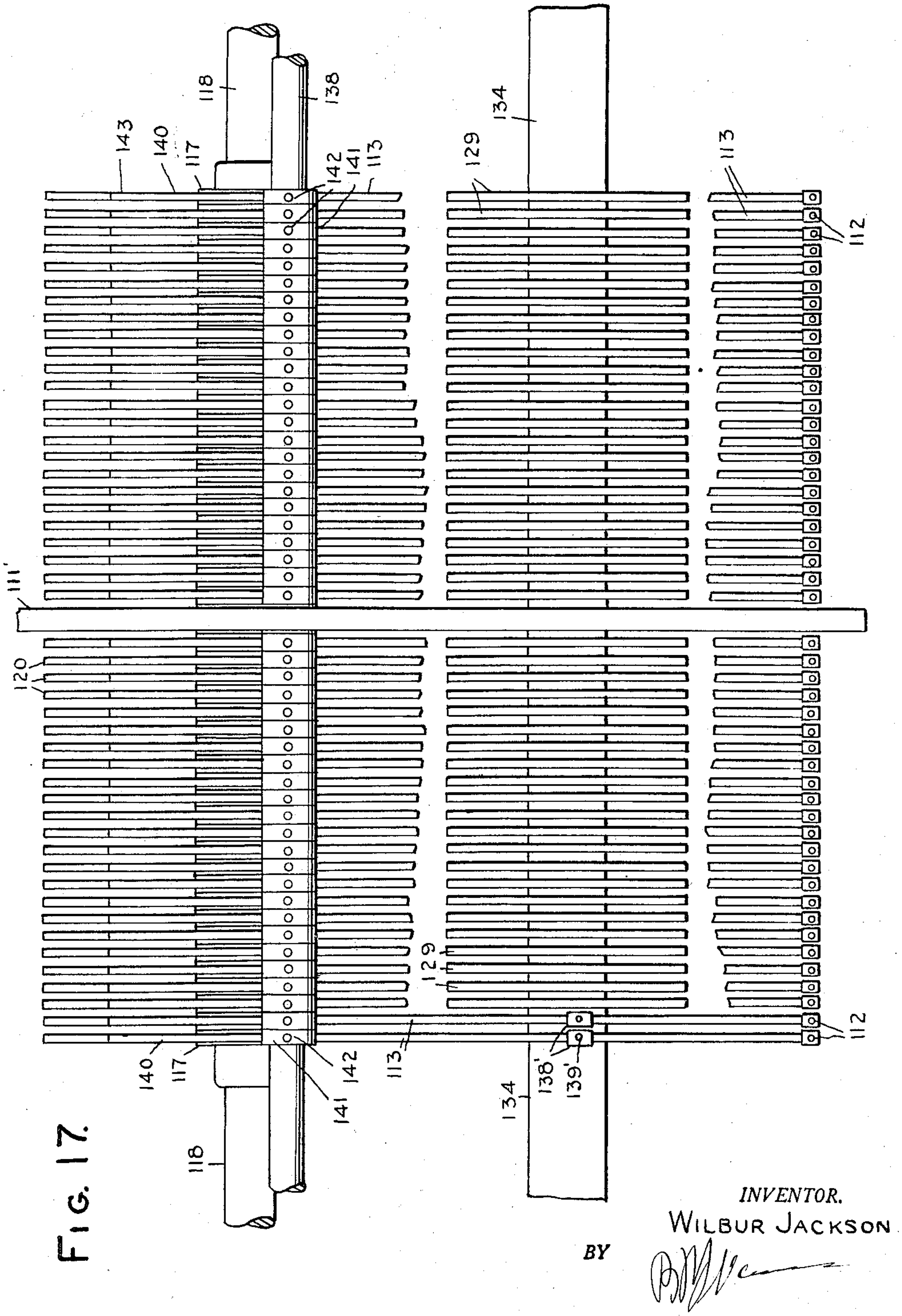
Figure 18:
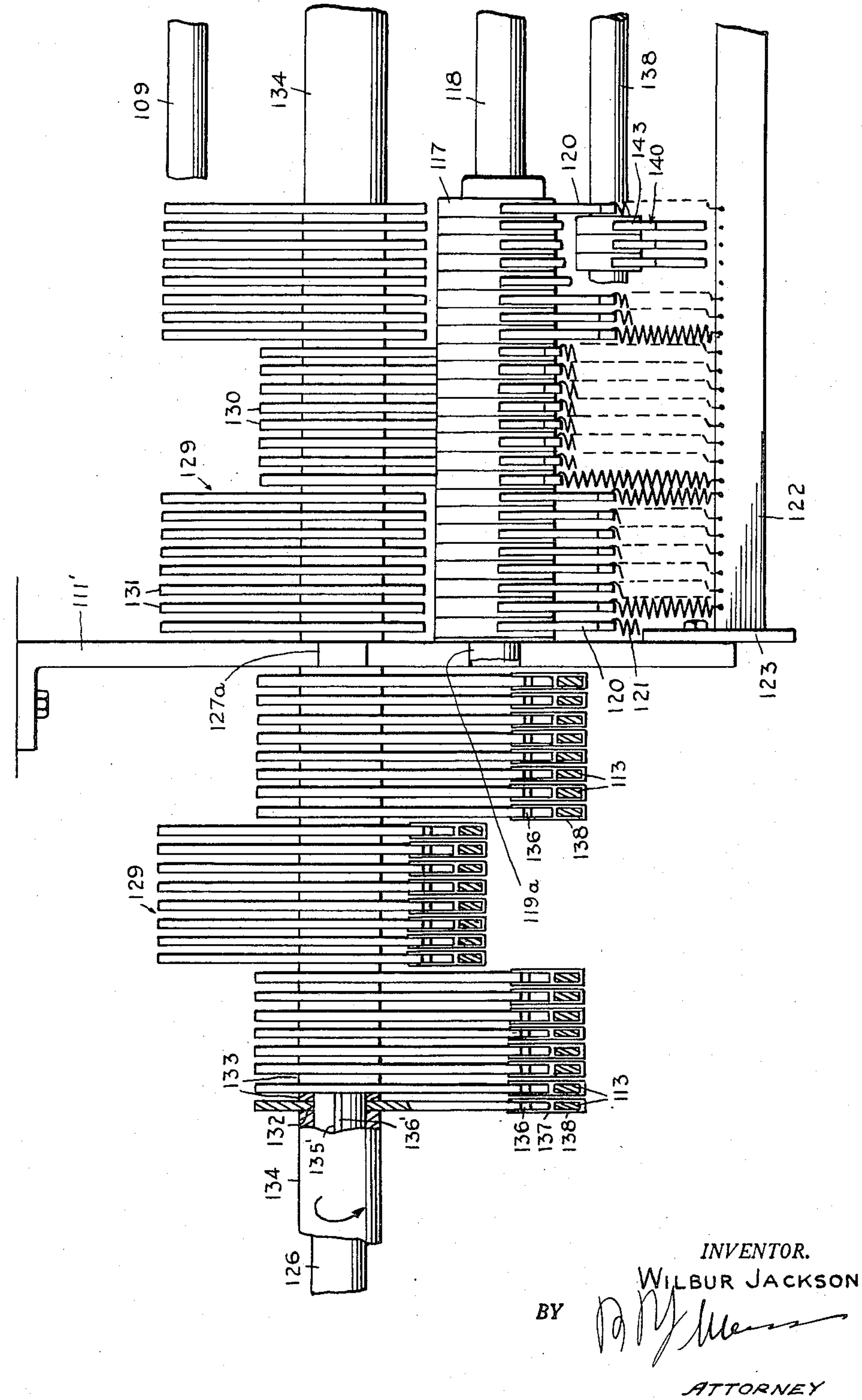
Figure 19:
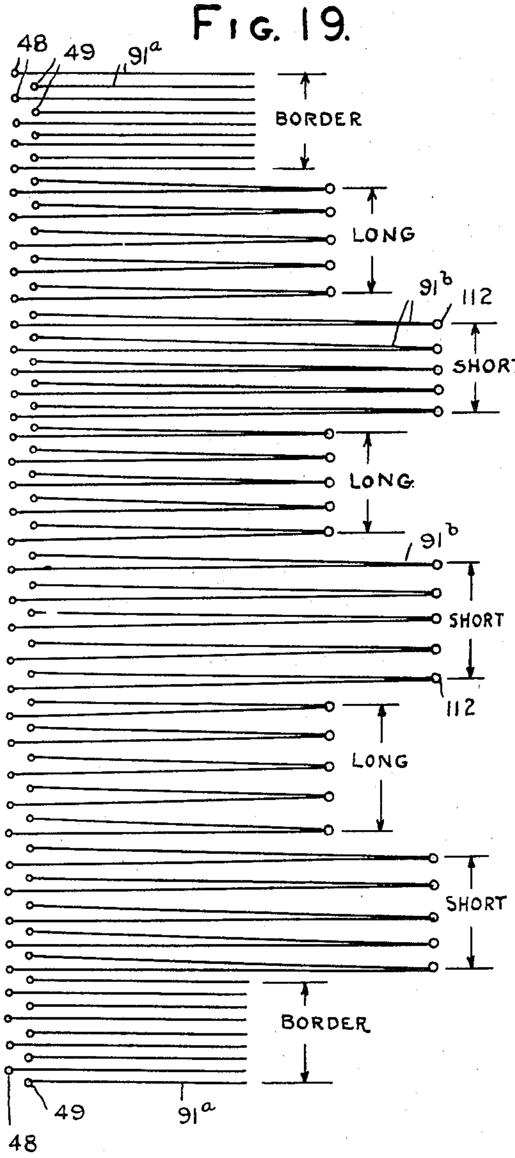
Figures 20, 21, 22, 23:
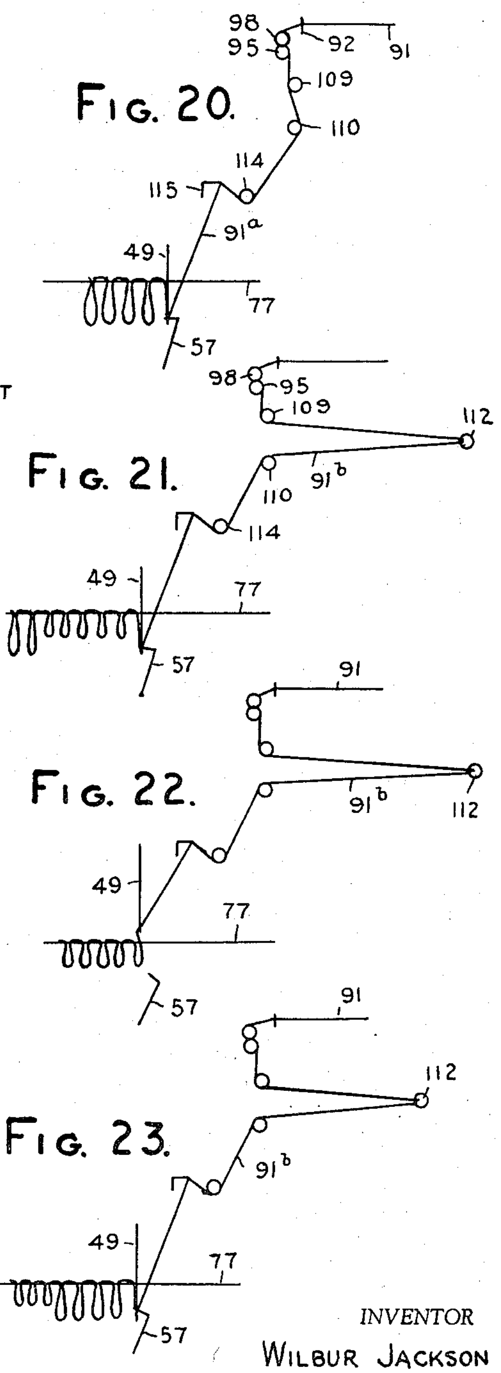
Figures 29, 30, 31, 32, 33, 34, 35, 36:
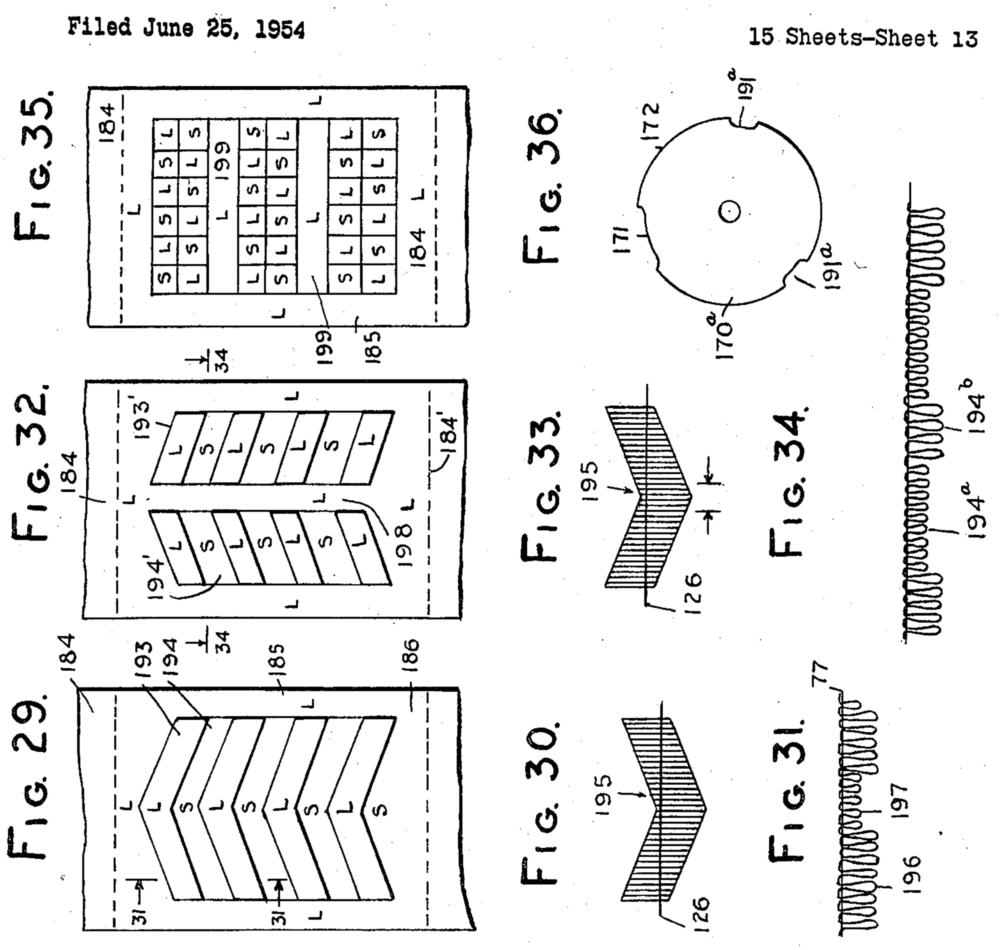
Figures 24, 25:
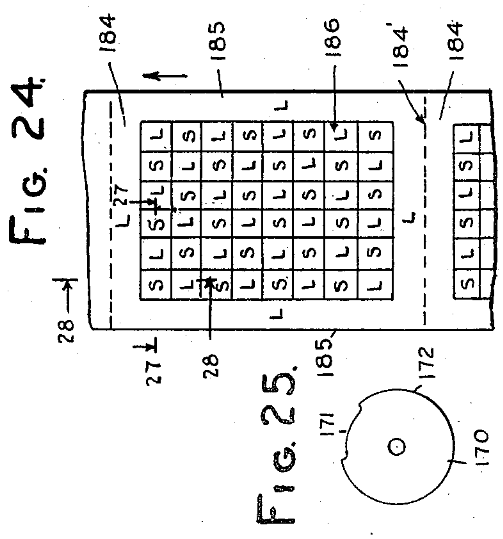
Figure 26:
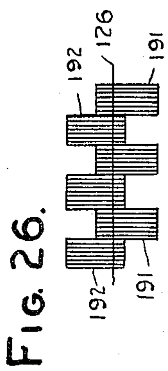
Figures 27, 28:
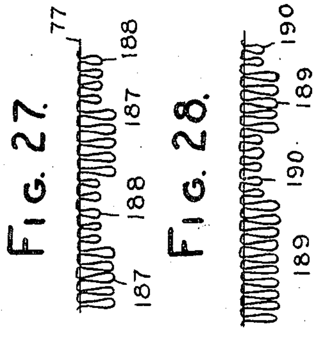
Figures 37, 37A:
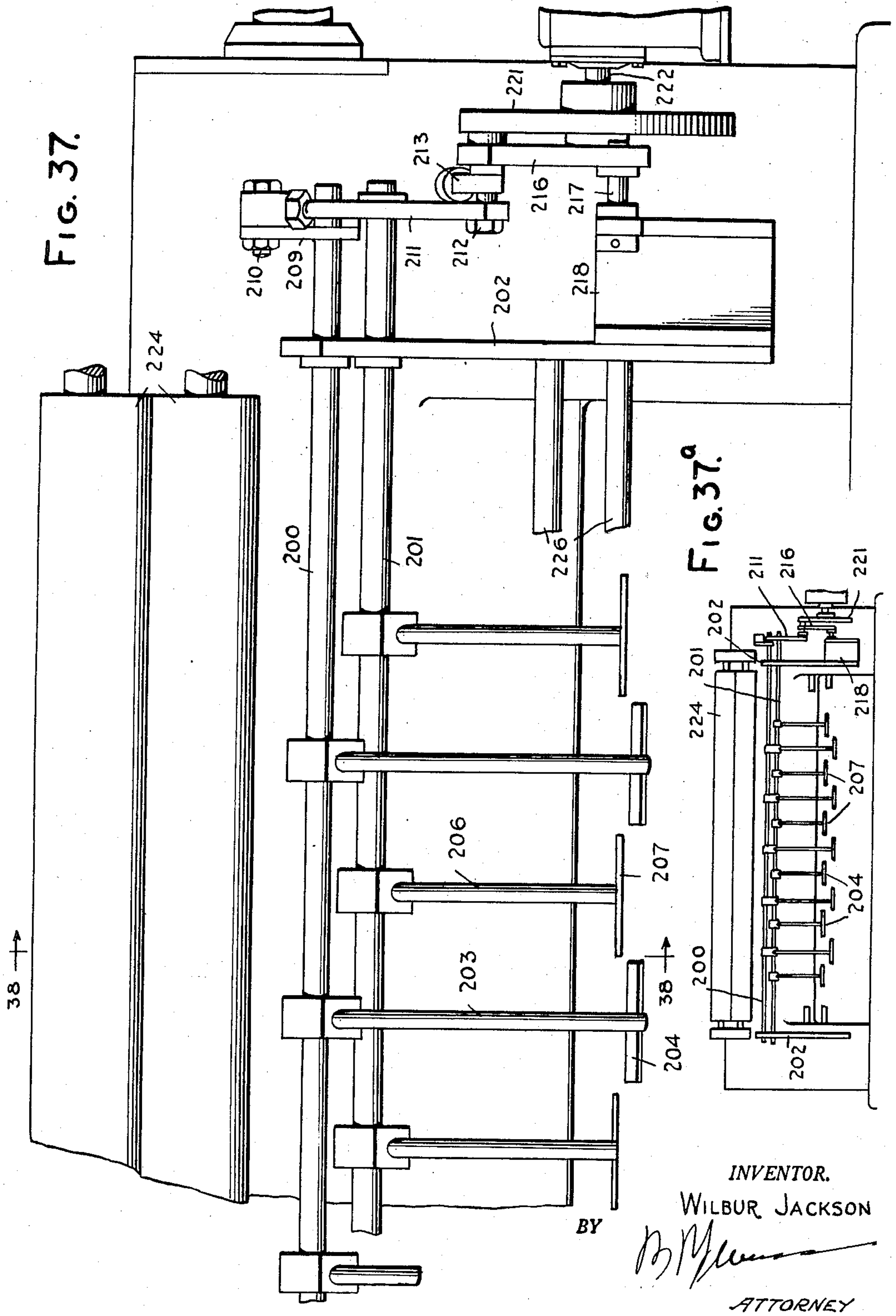
Figures 38, 39:
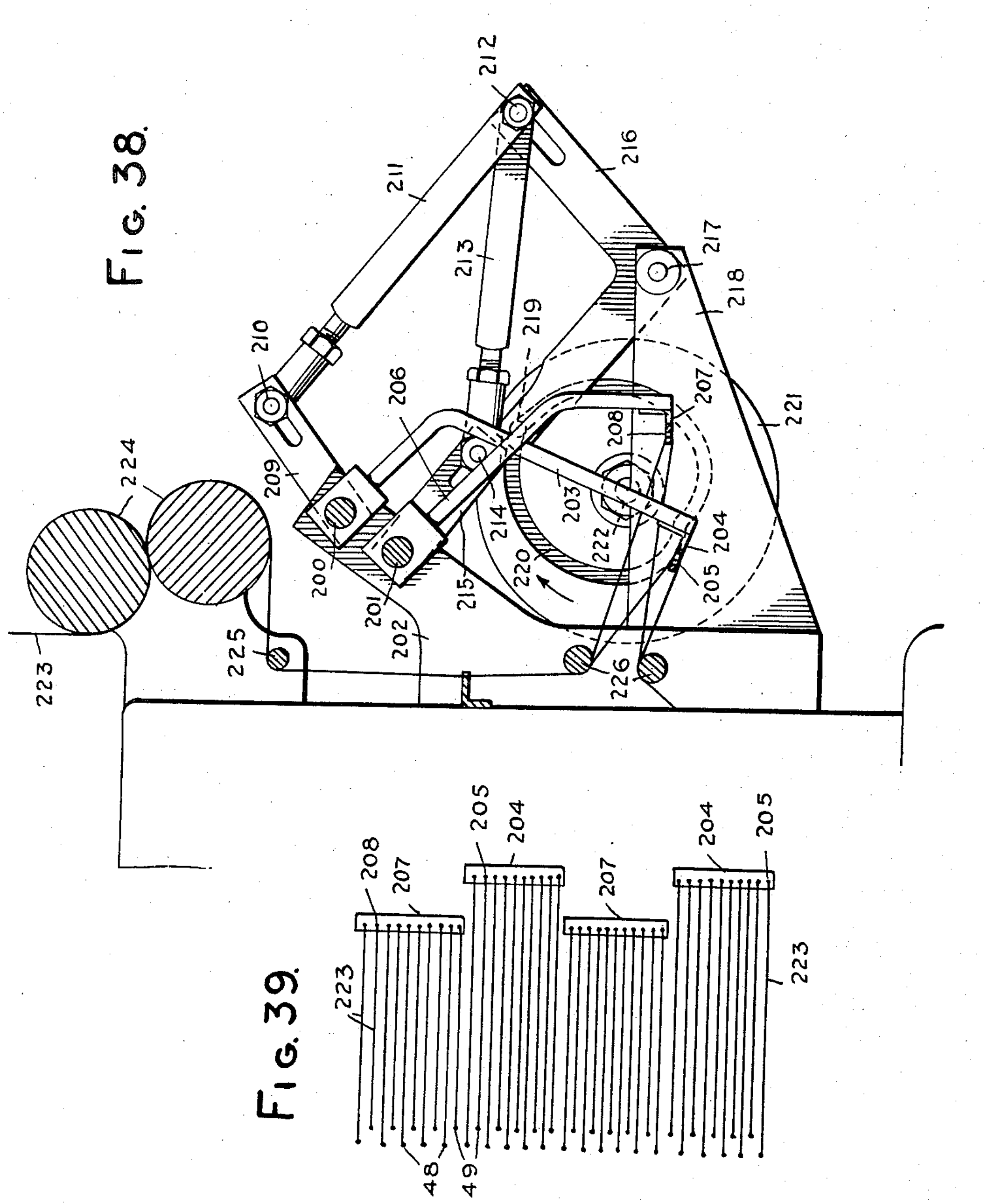

Figure 9*a* is a horizontal section taken on line *9a—9a* of Figure 9,

Figure 10 is a side elevation of the needles and loopers and associated elements, shown in Figure 9, parts omitted and parts broken away, Figure 10*a* is a plan view of the presser foot or bar and looper bar, parts broken away, associated elements being shown in horizontal section, and parts omitted, Figure 11 is a plan view of the drive means for the cam shaft, Figure 12 is a rear side elevation of the same, Figure 13 is an end elevation of the drive means, Figure 14 is a side elevation of an automatic circuit closing means including an adjustable cam disc device, Figure 14*a* is a side elevation of the cam included in the cam device of Figure 14, Figure 15 is an edge elevation of the cam device, Figure 16 is a vertical section taken on line 16—16 of Figure 12, Figure 17 is a rear elevation of the main cams and associated elements, parts broken away, Figure 18 is a plan view of the same, Figure 19 is a diagrammatic view illustrating the passage of the yarn to the needles, for forming the borders and the field, Figure 20 is a diagrammatic view illustrating the operation of the sewing of the long loops in the border, Figure 21 is a similar view showing the sewing of a long loop which is subsequently pulled back to form a short loop when the looper releases the long loop, Figure 22 is a diagrammatic view showing the previously formed long loop pulled back after released by the looper to form a short loop, Figure 23 is a diagrammatic view showing the sewing of long loops which are not pulled back to form short loops, Figure 24 is a plan view, diagrammatic, of rugs tufted by the machine, Figure 25 is a diagrammatic view of the circuit closing cam used in tufting the rug of Figure 24, Figure 26 is a diagrammatic plan view of the main or pull back cams showing the adjustment for producing the design of the rug in Figure 24, Figure 27 is a diagrammatic view, representing a transverse section, taken on line 27—27 of Figure 24, Figure 28 is a diagrammatic longitudinal section taken on line 28—28 of Figure 24, Figure 29 is a diagrammatic plan view of a further rug which may be made by my machine, illustrating a different design, Figure 30 is a diagrammatic plan view showing the adjustment of the main or pull back cams for producing the design of Figure 29, Figure 31 is a diagrammatic longitudinal section taken on line 31—31 of Figure 29, Figure 32 is a plan view of a rug showing a further different design, Figure 33 is a diagrammatic plan view showing the adjustment of the cams for producing the design shown in Figure 32, Figure 34 is a diagrammatic transverse section taken on line 34—34 of Figure 32, Figure 35 is a diagrammatic plan view of a rug showing a further design, Figure 36 is a diagrammatic view of a circuit closing cam used to produce the design of Figure 35, Figure 37*a* is a rear elevation of a modified form of machine for producing blocks of long and short tufts, Figure 37 is an enlarged side elevation of one end of the modified form of machine shown in Figure 37*a*, parts broken away, Figure 38 is a transverse section taken on line 38—38 of Figure 37, Figure 39 is a diagrammatic view showing the passage of the yarn from the pull back plates to the needles.

Figures 2, 3:
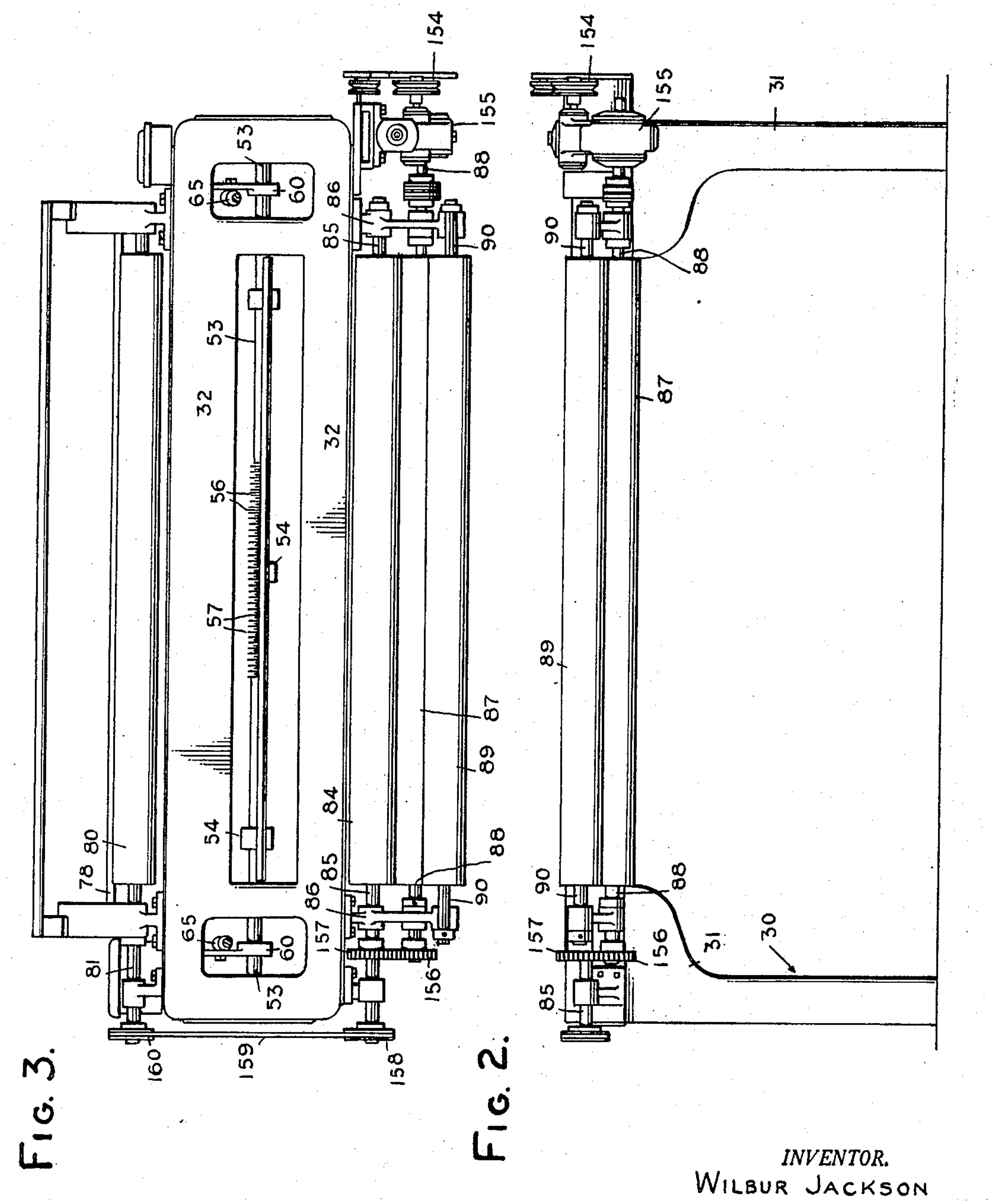
Figure 2 is a front side elevation of the lower section of the machine.
Figure 3 is a plan view of the lower section shown in Figure 2.

The frame of the machine comprises a lower section 30, including vertical ends 31, connected by a bed plate 32, Figures 1 to 3 inclusive and 6 to 8 inclusive. The frame includes an upper section 33, connected with vertical ends 34 which are rigidly mounted upon the base 32. The upper section 33 is hollow, as shown.

Arranged within the upper frame section 33 is a horizontal drive shaft 35, see more particularly Figures 7 and 8, and this drive shaft is journaled in fixed bearings 36 and 37. The bearings 36 are spaced from the ends of the casing section 33, while the bearings 37 are at the ends of the casing section 33.

Rigidly mounted upon the bottom of the casing section 33, Figures 1, 8 and 9, and depending below the same are vertical guide sleeves 38. Each guide sleeve 38 includes an inner vertical sleeve 38', forming with the sleeve 38 a chamber 39', for receiving oil. The casing section 33 is partly filled with oil and some of this oil passes through a port 40' into the chamber 39', and to the interior of the inner sleeve 38' by transverse ports 41'. Vertical shafts 39 are mounted to reciprocate within the inner sleeves 38' and operate through stuffing boxes 40. At their upper ends, the vertical shafts 39 are pivotally connected at 41 with connecting rods 42, Figures 7 and 8, and these connecting rods are provided with cam straps 43, receiving operating cams 44, which are mounted upon the drive shaft 35, to rotate therewith. It is thus seen that rotation of the shaft 35 will reciprocate the vertical shafts 39. The lower ends of the vertical shafts 39 are held within clamps 45, integral with blocks 46, rigidly secured to a horizontal needle bar 47, Figures 1, 8, 9 and 9*a*. This needle bar carries vertical needles 49 and 48, arranged in pairs, and the needles are also arranged in groups extending longitudinally of the needle bar, and the needles in one group are staggered with respect to the needles in the other group, Figures 10*a* and 19. This arrangement of the needles enables the loops to be sewed in closer relation, Figures 9, 10, 10*a* and 19. The needles 48 and 49 operate through openings 50 formed in a presser bar 51, Figures 1, 8, 9 and 10*a*, connected at its ends with vertical brackets 52, extending upwardly for attachment with the casings 38, Figures 7 and 9.

Arranged beneath the bed 32, Figures 6, 7, 8 and 9, is a horizontal looper rock shaft 53, having upstanding cranks 54 rigidly secured thereto, and these cranks have a horizontal looper bar 55 rigidly secured thereto. This looper bar has pairs of upstanding loopers 56 and 57 rigidly secured thereto and extending above the same, and the bills or hooks 58 of these loopers extend in the direction of the feed of work, Figure 9. The loopers 56 and 57 are arranged in pairs corresponding to the arrangement of the pairs of needles 48 and 49, and the loopers are arranged in groups extending longitudinally of the looper bar, and the loopers in one group are staggered with respect to the loopers in the other group. The group of loopers 56 are arranged for coaction with the needles 48 while the group of loopers 57 are arranged for coaction with the needles 49, Figure 10*a*. This machine will produce unsevered tufts or loops, but it is to be understood that the tufts or loops may be severed, as is well known in the art. The term "tuft" is used in a broad sense to cover severed or unsevered loops. The rock shaft 53 is journaled near its ends, Figure 8, in stationary bearings 59, and cranks 60, Figures 6, 6*a* and 8, are rigidly secured to the rock shaft 53, near its ends, to turn the rock shaft. These cranks have slots 61 for receiving pivots or bolts 62, Figures 6 and 6*a*, carrying nuts 63. Each bolt 62 has an enlarged cylindrical portion 64, forming a shoulder to clamp against the crank 60. Pivoted upon the cylindrical portions 64 are heads 65, and these heads are connected with rods 66, having heads 67 rigidly secured thereto. The heads 67 are pivoted at 68 to heads 69, and these heads 69 are rigidly secured to rods 70, operating through stationary guides 71. The rods 70 are rigidly connected at their upper ends with heads 72, pivoted at 73, with connecting rods 74. These connecting rods carry cam straps 75, rigidly secured thereto, receiving cams or eccentrics 76, rigidly mounted upon the guide shaft 35. It is thus seen that rotation of the drive shaft 35 will rock the shaft 53, which in turn will rock the looper bar 55 and the loopers 56 and 57 will be swung forwardly and rearwardly with respect to the needles. By adjusting the bolts 62 within the slots 61, the throw of looper bar 55 may be adjusted. As is customary in tufting machines, when the needles move downwardly to penetrate the fabric and pass beneath the same, loops are formed beneath the fabric, and the loopers then move forwardly in the direction of travel of the work feed so that their hooks enter the formed loops, and the hooks hold the loops against upward movement as the needles rise. When the needles reach the top of their upstroke, the loopers move rearwardly from the needles and out of the loops. As the needles descend, the loopers continue to move rearwardly from the needles and then forwardly and again enter the loops by the time the needles have reached the lowermost position and usually after the needles have moved up for a very short distance, to provide a slight slack in the loop. The timing is sometimes varied in the art.

The fabric backing 77, Figure 7, is fed over the base 32 in the direction of the arrow. This fabric backing may pass about guide bars or rollers 78 and 79, Figure 7, and then over a rear roller 80, rigidly mounted upon a horizontal shaft 81, journaled in fixed brackets 82. The fabric backing 77 then passes over a throat plate 83, Figure 7, having openings to receive the needles 48 and 49, Figures 7 and 9. This throat plate 83 is arranged beneath the presser bar 51. The fabric base then passes over a roller 84 rigidly mounted upon a shaft 85, journaled in brackets 86, Figures 6 and 8. The fabric backing then passes beneath a roller 87, mounted upon a shaft 88 journaled in the brackets 86. The fabric backing then passes over the roller 89, rigidly mounted upon the shaft 90, journaled in the brackets 86. These various rollers turn in the direction to feed the fabric backing forwardly to the left, as indicated in Figure 7.

Means are provided to feed the thread or yarn 91 to the needles. This means comprises a stationary horizontal guide bar 92, Figure 7, having openings for receiving the yarn and this yarn also passes through openings in a stationary guide bar 93, mounted upon fixed brackets 94. The yarn then passes over a lower feed roller 95 rigidly secured to a shaft 96, journaled in brackets 97. Arranged above the roller 95 is a companion pressure roller 98, mounted upon the shaft 99 which is journaled upon levers 100, pivotally mounted upon the brackets 97. The levers 100 are at the opposite ends of the roller 98 and these levers are pivotally connected at 102, Figure 5, with links 103, and the links 103 are pivotally connected at 104 with cranks 105, rigidly mounted upon a rock shaft 106 journaled in the stationary bearings 107. The rock shaft has a lever 108 rigidly secured thereto, Figure 4. When the lever 108 is swung rearwardly, Figure 4, levers 100 are swung upwardly, and roller 98 is swung from roller 95, and the rollers then leave the yarn from clamping engagement with the rollers. Either or both rollers 95 and 98 may have their peripheries roughened or they may be covered with material or sheets to prevent the yarn from slipping with relation to the rollers when the rollers are close together and have clamping engagement with the yarn. The purpose of the rollers is to continuously feed the yarn toward the needles in a regulated amount, during the operation of the machine.

The yarn next passes about stationary guide bars 109 and 110, mounted upon stationary brackets 111 and 111'. The outer sets of yarn are designated 91*a*, Figure 19, and the inner set of yarn is designated 91*b*. The outer sets of yarn 91*a* pass beneath the guide bar 110 and these outer sets of yarn are tufted for producing the side borders, as will be further explained. The other set of yarn 91*b* produce the tufted field and pass beneath the guide rod 109 and into and through eyes 112 of the pull back levers 113. The yarn 91*b* is fed in pairs to each eye 112, and the various pairs of yarn 91*b* forming the field and the yarn 91*a* forming the border are fed under a stationary guide rod 114, and through openings in the yarn guide bar 115, which reciprocates with the needle bar 45, and is secured to the clamps 45 by brackets 116, Figure 9, Figure 7. The yarn 91*a* and 91*b* is then fed to the needles. The yarn need not be retained in pairs in the openings at the guide bar 115, but the yarn passing from the guide bars are fed in pairs to the needles. Each pair of yarn passing through an eye 112 is fed to needles constituting a pair of needles. As clearly shown in Figure 19, the yarns 91*a* which form the border do not pass through the eyes 112, but the yarns 91*b* which form the field pass in pairs through the eyes and these pairs of yarn pass through pairs of needles.

The numeral 113 designates pull back levers which are provided at their lower ends with the eyes 112 which receive the yarn 91*b*. These pull back levers are generally vertically arranged. Each pull back lever is provided near and spaced from its upper end with a collar 117, rigidly secured thereto, Figures 7 and 17. These collars are individually pivotally mounted upon a horizontal shaft 118, the ends of which are journaled in vertical plates 118', Figures 4, 5 and 6. These plates are vertically adjustably mounted upon the brackets 111, by means of bolts 119' secured to the brackets 111 and extending through slots 120. The plates 118 are detachable from the brackets 111 and the shaft 118 is removably mounted within notches 119 formed in the brackets 111, and a notch 119*a* formed in the bracket 111', Figure 7. Each pull back lever 113 is individually pivotally mounted upon the shaft 118, as stated, and the lever includes an extension or crank 120 rigidly secured to the collar 117. At its upper end, the upstanding crank 120 is connected with a retractile coil spring 121, attached to a stationary bar 122, Figures 7 and 18. The bar or angle iron 122 is rigidly attached at its ends to horizontal plates 123, Figure 6, having elongated slots 124, receiving bolts 125, carried by the brackets 111 and 111'. The plates 123 may be longitudinally adjusted and locked in the selected adjusted position to regulate the tension of the springs 121.

Arranged below the shaft 118 is a horizontal cam shaft 126, which is rotatably and removably mounted in notches 127 formed in the brackets 111 and a notch 127*a* formed in the bracket 111'. The shaft is held in the lowered position within the notches by removable straps 128, Figure 6, and is held against longitudinal displacement by any suitable means. This shaft 126 carries a plurality of main or pull back cams 129. These cams correspond in number and arrangement with the pull back levers 113. Each cam has a low point 130 and a high point 131 and gradually increases in radial dimension toward the high point. The two sides of the cam are identical and each cam is identical. The cams 129 have openings 132, for slidably receiving the shaft 126. Arranged between the cams 129 are spacers or washers 133 and sleeves 134 are arranged upon the shaft 126 at the ends of the group of cams. Clamping nuts 135 have screw-threaded engagement with the shaft 126 and are adjustable to bear against the sleeves 134, so that these sleeves will have their inner ends bearing against the cams 129, thereby clamping the cams and washers together, and locking the cams to the shaft 126 so that the cams and shaft rotate as a unit. The innermost washers 133 may be rigidly secured to the shaft 126 by welding or the like, while the other washers are slidable on this shaft. When the nuts 135 are loosened, the cams 129 may be turned upon the shaft 126, to radially adjust the cams, and the cams are again locked to the shaft. This permits of the circumferential adjustment of the cams 129, individually or in groups, with respect to the shaft 126, which in turn will vary the design of the tufted product. It is to be noted that the group of cams 129 does not extend throughout the major portion of the shaft 126, Figure 1. This is due to the fact that the machine is adjusted to tuft a narrow rug or mat, but as the width of the desired rug increases, further cams are added. Where the number of cams is materially increased, it may be difficult to hold the cams in adjustment upon the shaft 126, and I also contemplate forming a groove 135' in the shaft 126, and this groove would receive a longitudinal key 136', which would extend into a notch 137' formed in the cam 129. In this event, each cam 129 would be provided with a notch 137 at the selected circumferential point in its opening 132. I also contemplate providing each cam with a plurality of circumferentially spaced notches 137', so that each cam can have a number of circumferential adjustments upon the shaft 126. It is to be understood that any suitable means may be employed to lock the pull back cams in circumferential adjustment to the shaft 126.

The springs 121 serve to swing the lower portions of the pull back levers 113 toward the cams 129, so that these cams engage rollers 136 carried by spaced arms 137, rigidly secured to heads 138'. These heads are slidably mounted upon the pull back levers, to be longitudinally adjustable thereon, and are clamped in the selected adjusted position upon the levers 113 by bolts 139', see more particularly Figure 7*a*. The head 138' may be adjusted longitudinally of the lever 113, to vary the distance between the head 138' and the shaft 118 or turning point. The closer the head 138' is to the shaft 118, the greater the distance that the lower end of the lever 113 will be swung by the pull back cam 129. When the head 138' is adjusted to or from the shaft 118, the shaft 118 must also be vertically adjusted, so that the center of the roller 136 will be in alignment with the horizontal center of the shaft 126. It might be stated at this point that the function of the pull back levers is to place the yarn under tension between the feed rollers 95 and 98, and the loopers, and the degree of tension can be adjusted by adjusting the heads 138' longitudinally of the pull back levers.

A rock shaft 138 is journaled in the brackets 111 and 111' outwardly of the shaft 118 and the shaft 138 is provided at its opposite ends with handles 139, to turn it. The rock shaft 138 should be held in the adjusted position when turned to such position, and this may be effected by having a tight engagement between the shaft 138 and the brackets 111, although separate means, such as a set screw, may be employed to lock the shaft 138 in the selected adjusted position. The numeral 140, Figures 6*b* and 7, designate control arms, corresponding in number and arrangement to the extensions 120 of the levers 113. Each control arm is provided at its inner end with a collar 141, and this collar may be turned upon the shaft 138 and locked in an adjusted position by a set screw 142. Each control arm is provided at its free end with a lateral extension 143, arranged to contact with the extension 120. When the control arm 140 is in the retracted position, Figure 7, it will not interfere with the swinging movement of the extension 120 and its pull back lever 113. When the control lever 140 is swung forwardly sufficiently, Figure 6*b*, it will contact with the corresponding crank 120 and swing it forwardly and this crank will then hold the pull back lever 113 in the rear position, Figure 6*b*, so that its roller 136 will not be actuated by the cam 129, and the pull back lever will accordingly be taken out of operation. The control levers 140 may be first circumferentially adjusted upon the shaft 138 and locked upon the shaft, and then the selected control levers 140 will be brought into engagement with the extensions 120, by a turning movement of the rock shaft 138. The rock shaft 138 may be held stationary, and selected control levers swung forwardly thereon to engage the extensions 120 to swing them forwardly, and such control levers then lock to the shaft 138. The arrangement is such that the control levers 140 are ordinarily out of contact with the extensions 120, during the swinging movement of these extensions, but selected control levers 140 may be swung forwardly to hold corresponding extensions 120 in the forward position, and this will hold the rollers 136 of such pull back levers 113 spaced from the corresponding cams 129, so that pull back levers are thrown out of action.

As shown in Figures 1 and 4, a motor 144 is mounted upon the bottom 145 of the main frame and the motor drives a grooved pulley 146, engaged by a belt 147, extending upwardly to engage a grooved pulley 148, mounted upon the drive shaft 35. The shaft 35 has a grooved pulley 149 rigidly mounted thereon, engaged by a belt 150, extending upwardly to engage a grooved pulley 151, which drives speed reducing gearing 152, which in turn drives the lower roller 95. The grooved pulley 149 also drives a belt 153 extending downwardly to drive a grooved pulley 154, in turn driving speed reducing gearing 155, Figures 2 and 4, and the speed reducing gearing 155, also Figure 3, drives the shaft 88 which rotates the roller 87, Figures 3 and 7. The shaft 88 is provided at its opposite end with a gear 156, engaging a gear 157 which is rigidly mounted upon the shaft 85 of the roller 84. The shaft 85 has a grooved pulley 158, Figure 3, rigidly secured thereto, engaged by a belt 159, engaging a grooved pulley 160, rigidly mounted upon the shaft 81 carrying the roller 80. The roller 89 is driven by a frictional engagement with the roller 87.

Rigidly mounted upon the opposite end of the main drive shaft 35 from the pulley 148 is a grooved pulley 161, Figures 12 and 13. The pulley 161 is engaged by a belt 162, passing over a belt tightener 163, Figure 13, and engaging a pulley 164 included in a floating driving unit of an automatic driving and braking device. This floating unit also includes a grooved pulley 165, rigidly connected with the pulley 164 to turn therewith as a unit. The pulley 165 is engaged by a belt 166, extending to a grooved pulley 167 of a reduction gearing 168 which serves to drive a shaft 169 at a reduced speed.

The shaft 169 has a vertical cam disc 170 rigidly mounted thereon and this cam disc is provided at its periphery with a low part 171 and a high part 172. In order that the relative lengths of the high and low parts may be varied, I mount plates 173 upon opposite faces of the disc 170 and these plates have circumferential slots 174 receiving bolts 175. The plates 173 may be circumferentially adjusted with respect to the disc 170 and locked to the disc in the selected adjusted position. The plates 173 have low parts 176 and high parts 177 corresponding to the high and low parts of the disc 170. The distance between the high parts 177 may be varied, as desired, and the high parts 177 will form a continuation of the high parts 172.

The floating unit comprising the pulleys 164 and 165 are rotatably mounted upon a horizontal shaft 177', driving a shaft 178', Figure 11, through speed reducing gearing 179'. The shaft 178' is detachably connected with the cam shaft 126 to drive it, by means of a coupling 180'. The numeral 181' designates an electrically operated clutch device, adapted when energized to lock the pulley 164 to the shaft 177', to drive the same, and to unlock these parts when the clutch device is deenergized. The numeral 182' designates a brake device, adapted when energized to hold the shaft 177' against rotation, and to release the shaft when energized.

The numeral 178, Figure 14, designates a switch, mounted upon a support 179 which is stationary. This switch comprises a plunger 180, equipped with a roller 181, arranged to engage the cam disc 170 and its plates 173. When the roller 181 moves into contact with the low part 171, the switch 178 is opened, and the switch is closed when the roller engages the high part 172. The switch 178 may be manually opened by means of a push button **181*a* or the like. A circuit is provided including contacts 182, engaging insulated rings 183, and these rings 183 are electrically connected with the clutch device 181' and 182' and also with the switch 178. When the switch is closed, caused by the roller 181 traveling upon the high part 172 of the cam disc, the clutch device 181' is energized and the pulley 164 drives the shaft 177' and the brake device 182' is de-energized. When the switch 178 is opened, which occurs when the roller 181 engages the lower part 171, the clutch device 181' is deenergized and the brake device 182' is energized and the shaft 177' stopped and held against rotation. When the shaft 126 is stationary, the pull back cams 129 are stationary, and the pull back levers 113** are not moved, and hence no added tension is applied to the yarn, and the machine will then produce long loops by the operation of all of the tufting devices.

The operation of the machine is as follows:

Figure 24 shows a tufted rug made by my machine including transverse and horizontal rows of blocks of loops. The loops in one block are short and the loops in the alternate block are long, with respect to the transverse and longitudinal dimension of the rug. The rug includes the base fabric or backing, which is fed forwardly as shown in Figure 6 and also Figure 24. The design, Figure 24, comprises end borders 184 and side borders 185 and a field 186. The field includes the blocks designated "S" and "L" which means that the loops are short or long. The loops 187 in the side borders 185 and in the "L" blocks are long, Figure 27, and the loops 188 in the "S" blocks are short. The loops 189 in the end border 184 and in the "L" blocks are long and the loops 190 in the "S" blocks are short, Figure 28. To produce the tufted design of Figure 24, the cams 129 are adjusted in groups 191 and 192 and these groups have the high points of their cams spaced 180°. The cams 129 are rotating clockwise, Figures 6 and 6*b*. The strands or yarn **91*a*, Figure 19, which pass to the needles 48 and 49, forming the loops in the outer ends of the end borders 184 and the side borders 185, do not pass through the eyes 112 of the pull back levers, and these threads or strands are not placed under sufficient tension to cause them to be pulled back for producing short loops but will produce the long loops 187, Figure 27, and the long loops 189, Figure 28. When starting the machine, the cam disc 170 may have the roller 181 engaging the low part 171 and all pull back cams 129 are now stationary and the pull back levers 113 are stationary and not exerting tension upon the strands or yarn passed through the eyes 112 and fed to the needles which are forming the loops in the leading end border 184 between the side borders 185. Long loops are therefore formed in the leading end border 184 throughout its entire length including the merging of the same with the side borders 185**. The cam disc is rotating clockwise, Figures 14 and 14*a*, and the forming of the leading end border 184 continues until the roller 181 passes to the high part 172 of the cam disc 170. When this occurs, the cam shaft 126 is set into rotation, and the groups of cams 129 are rotated clockwise, Figures 6b and 7, to form the blocks of short and long loops in the field 186. To form the blocks of short loops, the groups of cams 191 have their lower points arranged rearmost, and as the tufting continues, the high points of the cams in this group turn rearwardly, and swing the corresponding pull back levers 113 rearwardly, placing the strands or yarn under considerable tension, so that the formed loops are pulled back to produce the short loops. The groups of cams 192 which form the long loops, have their high points arranged rearmost, at the starting of the operation, and these high points swing forwardly, causing the corresponding pull back levers 113 to swing forwardly and remove the tension from the strands or yarn forming the long loops in the blocks. By the time the cams have turned for 180°, their operation is reversed, and the groups of cams which were pulling against the strands or yarn will move forwardly to relieve the tension, while the other groups of cams will pull against the strands or yarn to place the same under tension. The next transverse group of blocks is therefore formed upon the next turning of the groups of cams for 180°. The operation is continued throughout the entire tufting of the field which is completed when the roller 181 again engages the low part 171 and the trailing end border 184 is formed, and the operation is repeated for producing the next trailing rug. The end borders 184 are twice as wide as the side borders 185, and are severed at their transverse centers 184', for separating the rugs.

There is of course one pull back cam 129 operating with each pull back lever 113, engaging the thread or yarn passing to the needle which sews the loops in the field 186. In Figure 21, showing the operation of the tufting mechanism for sewing the loops in the field, the needle 49 has moved downwardly through and below the fabric to form a long loop and the looper 57 enters the long formed loop. The rollers 95 and 98 are feeding this strand or yarn in a constant regulated amount to the needle and the guide bar 115 and rod 114 also regulate the tension of the strand or yarn upon the upstroke of the needle. During the feeding of the yarn, the eye 112 is continuously traveling rearwardly with the pull back lever, and hence the strand or yarn 91b is under uniform tension which is present when the looper 57 is in the long loop previously formed, Figure 21. When the needle reaches its top stroke and the looper 57 moves out of the long loop, the tension on the thread or yarn 91b is sufficient to pull the last formed long loop upwardly, forming a short loop, Figure 22. As more clearly shown in Figure 7, upon the rearward or upstroke of the needle bar, the guide bar 115 travels upwardly with respect to the stationary guide rod 114 and forms a fold or loop in the yarn which takes up additional slack in the yarn and places the same under additional tension beyond that produced by the cam 129 and lever 113, and hence the yarn is placed under sufficient tension, notwithstanding the regulated continuous feed of the yarn, to form the short loops by pulling back the last-formed loop. When the needle moves forwardly or downwardly upon the next stroke, the guide bar 115 moves downwardly with relation to the rod 114 and the fold or loop is payed out, producing a slack in the yarn in addition to the continuous regulated feed of the yarn, and this slack combined with the regulated feed of the yarn, enables the needle to form the then last long loop without tending to take yarn from the next previously formed loop. The needle bar 39 completes a plurality of cycles of operation while the cam is turning for one hundred and eighty degrees, whereby a plurality of short loops are formed in one group and then a plurality of long loops in the next succeeding group. How much pull back there will be, which determines the length of the short loop, will be controlled by the amount of tension placed upon the yarn or strand, and this in turn will depend upon the extent of rearward movement of the pull back lever 113. This extent of rearward movement can be regulated by adjusting the head 138' longitudinally upon the pull back lever 113. Figure 23 shows diagrammatically the sewing of the long loops in the field and in that portion of the end border between the side borders. The needle 49 has moved downwardly to form the long loop and the looper 57 moves into the long loop, and the eye 112 is traveling forwardly toward the needle. The thead or yarn 91b is not under tension and there is no pull back which will shorten the loop after the needle has reached the end of its top stroke and the looper moves out of the loop. Figure 20 shows diagrammatically the formation of the long loops in the side borders 185. The strand or yarn 195a does not pass to the eye of the pull back lever and there is no tension placed upon the yarn sufficiently to pull it back and produce the short loops. It might be stated that there is a little more tension on the yarn forming the loops in the side border, than upon the yarn forming the long loops when the eyes 112 are moving forwardly toward the needle, or when the eyes 112 are stationary, which would also produce long loops, and the reduced tension upon the yarn when the eyes 112 are traveling forwardly, will cause the long loops thus produced to be slightly longer than the other long loops, but much longer than the short loops.

In Figure 29, I have shown a rug having the same end borders 184 and side borders 185, and a field 186 provided with generally V-shaped designs 193 and 194, having long and short loops, as indicated. To produce this design, the cams 129 are arranged in a continuously generally V-shaped group 195, Figure 30, wherein the high points of the cams are in the rear position, in a graduated manner. As the group of cams rotate clockwise, the pull back levers 113 move forwardly, and the design 193 is formed having long loops 196. The design is completed when the group of cams has turned for 180° and when the group of cams is turned for the next 180°, the high points travel forwardly and produce the design 194 having the short loops 197, and the next design 193 has the long loops 196, Figure 31.

Figure 32 shows a design similar to that shown in Figure 29, except that a long strip 198 of long loops extend between the designs 193' and 194'. The designs 194' have short loops and the designs 193' have long loops. The short loops are indicated at 194a, Figure 34, and the long loops of strip 198 are indicated at 194b. The long loops in the strip 198 are produced by holding the intermediate hold back levers in the rear position, so that their rollers 136 cannot contact with the cams 129. This is done by turning the shaft 138 counterclockwise, Figure 6b, so that selected arms 140 engage the extensions 120 and swing the rear ends of the corresponding levers 113 rearwardly. The remaining arms 140 do not engage the extensions 120. The same operation is employed to produce the transverse end borders 184 and the side borders 185.

In Figure 35, I show a rug having a design like that shown in Figure 24, except that transverse stripes 199 are added. These stripes have long loops of the same length as the end border. The end borders 184 and the side borders 185 are formed in the same manner as described in making the design of Figure 24. Instead of using the cam disc 170, I employ a cam disc 170a, identical with the cam disc 170 except that it has additional short low parts 191a, and the same high part 172 and low part 171. When the roller 181 engages the low part 171, the end border 184 is tufted to produce the long loops, and after this, the roller engages the high part 172 and the field is tufted to produce the blocks of short and long loops, like Figure 24, and after two transverse sets of blocks have been produced, the roller again engages low part 191a, and the rotation of the cams will stop and the needles tuft the strip 199 with the long loops like the end border 184. When the roller again engages the next high part, the needles will tuft the next transverse sets of blocks having short and long tufts and when this is completed, the roller will engage the next low part 191*a* and the next transverse strip 199 will have long tufts formed therein. The roller will next engage the next high part 192 and the needles will form the next set of blocks having long and short tufts. The roller will then engage the low part 171 and the trailing end border 184 will be formed with the long tufts.

Attention is now called to Figures 37 to 39 inclusive, showing a modified form of the invention. The machine shown in these drawings includes an upper horizontal rock shaft 200 and a lower horizontal rock shaft 201, and each of these shafts is journaled at its opposite ends in stationary brackets 202. The shaft 200 has arms 203 rigidly secured thereto, and these arms are provided at their lower ends with plates 204, having openings 205 formed therein. The rock shaft 201 has arms 206 rigidly secured thereto, provided at their lower ends with plates 207, rigidly secured thereto. These plates 207 have openings 208 to receive the strands or yarn.

The rock shaft 200 has a crank 209 rigidly secured thereto, carrying a pivot 210, which may be adjusted longitudinally of the crank 209. The pivot 210 is pivotally connected with a link 211, pivotally connected with a pivot 212. This pivot is pivotally connected with a link 213, connected with a pivot 214. Pivot 214 is secured to the crank 215, and may be adjusted longitudinally of the crank 215. The link 213 and crank 215 are pivotally connected and the crank 215 is rigidly secured to the rock shaft 201. It is obvious that the movement of the pivot 212 will turn the shafts 200 and 201 in opposite directions.

The pivot 212 is connected with and shifted by a bell crank lever 216, pivoted at 217 upon a stationary bracket 218. The bell crank lever 216 is provided at its free end with a pin or element 219, operating within a cam groove 220 formed in a cam 221. The cam groove is of the same shape as the cams 129. The cam 221 is mounted upon a shaft 222, rotated by any suitable means.

The strands or yarn 223 pass between driven feed rolls 224, and about guide rods 225 and 226. One set of strands will pass through the openings in the plates 204 and the other sets of strands will pass through the openings in the alternate plates 207. These strands then pass to the needles of the tufting machine, as shown in Figure 7.

The movement of the plates 204 and 207 correspond to the movement of the pull back levers 113. When one set of plates 204 is moving forwardly, they produce blocks of long loops, while the plates 207 are moving rearwardly and produce blocks of short loops. In Figure 39, these strands are shown passing to the needles 48 and 49. The construction shown in Figures 37 through 39 will produce the design constituting the field 186 of Figure 24, namely, the blocks having short and long tufts, and alternately arranged.

In connection with the first form of the invention, the work feed means feeds the work longitudinally in a forwardly direction and is of course properly timed with respect to the operation of the needles and the loopers, as is well known in the operation of tufting machines.

In connection with the second form of the invention, the pull back mechanism is used with the same needles, loopers, and work feed means, as shown and described in connection with the first form of the invention.

It is to be understood that the forms of my invention herewith shown and described are to be taken as preferred examples of the same, and that various changes in the shape, size and arrangement of parts may be resorted to, without departing from the spirit of my invention or the scope of the subjoined claims.

Having thus described my invention, what I claim is:

1. In a tufting machine, a generally horizontal needle bar, a plurality of needles mounted upon the needle bar and having eyes adapted to receive threads and arranged in a longitudinal group, the needles near the ends of the longitudinal group serving to sew loops in the side borders of the tufted product while the intermediate needles serving to sew loops in the field of the tufted product, means to reciprocate the needle bar, a plurality of loopers arranged near the needles and corresponding in number with relation thereto, means supporting the loopers and reciprocating the same, means for feeding prescribed lengths of threads to the eyes of all of the needles, means for engaging the portions of all of the threads passing from the thread feeding means to the needles and to pull back upon such threads when the needles move rearwardly and to pay out such portions when the needles move forwardly, movable pull back elements for engaging the threads only which pass to the intermediate needles, cams to operate the pull back elements, a shaft carrying the cams, and means to alternately stop and drive the shaft while the needle bar is reciprocating.

2. In a tufting machine, tufting mechanism comprising a reciprocatory needle having an eye adapted to receive a thread and a reciprocatory looper to coact with the needle, means for engaging the thread and feeding the same in prescribed lengths to the eye of the needle during the operation of the machine, a stationary guide element arranged near the needle, a reciprocatory guide movable with the needle and arranged near the guide element and coacting with the guide element to pull back upon the thread when the needle moves rearwardly and to pay out the yarn when the needle moves forwardly, and means separate from the stationary guide element and reciprocatory guide for engaging that portion of the thread passing from the yarn feeding means to the needle to pull back such portion.

3. In a tufting machine, tufting mechanism comprising a reciprocatory needle having an eye adapted to receive a thread and a reciprocatory looper to coact with the needle, means for engaging the thread and feeding the same in prescribed lengths to the eye of the needle during the operation of the machine, means for engaging that portion of the thread passing from the thread feeding means to the needle to pull back upon such portion when the needle moves rearwardly and to pay out such portion when the needle moves forwardly, a pivoted pull back lever separate from said pull back means and having a part for engaging that portion of the yarn passing from said yarn feeding means to the needle, a cam arranged near the pull back lever, an element longitudinally adjustable upon the pull back lever and arranged to engage the cam, and means to drive the cam.

4. In a tufting machine, tufting mechanism including a reciprocatory needle having an eye adapted to receive a thread, and a reciprocatory looper to coact with the needle, roller means to engage the thread to feed the same to the eye of the needle, means to drive the roller means at a substantially constant speed during the operation of the machine for feeding the thread in prescribed lengths to the needle, means for engaging that portion of the thread passing from the thread feeding roller means to the needle to pull back upon such portion when the needle moves rearwardly and to pay out such portion when the needle moves forwardly, a pull back lever for engaging said portion of the thread passing from the thread feeding roller means to said needle, and a cam to move the pull back lever in one direction.

5. In a tufting machine, tufting mechanism comprising a reciprocatory needle having an eye adapted to receive a thread, a reciprocatory looper to coact with the needle, means for engaging the thread and feeding the same in prescribed lengths to the eye of the needle during the operation of the machine, means for engaging that portion of the thread passing from the thread feeding means to the needle to pull back upon such portion when the needle moves rearwardly and to pay out such portion when the needle moves forwardly, a movable pull back element for engaging said portion of the thread passing from the yarn feeding means to the needle, a cam to move the pull back element in one direction, and adjustable means to hold the pull back element in a position so that it cannot be moved by the cam.

6. In a tufting machine, tufting mechanism including a reciprocatory needle having an eye adapted to receive a thread, a reciprocatory looper to coact with the needle, means for engaging the thread and feeding the same in prescribed lengths to the eye of the needle during the operation of the machine, means for engaging that portion of the thread passing from the thread feeding means to the needle to pull back upon such portion when the needle moves rearwardly and to pay out such portion when the needle moves forwardly, a pull back element for engaging said portion of the thread, a cam having high and low points for moving the pull back element, and means to drive the cam in timed relation with the needle so that the needle will sew a plurality of loops while that portion of the cam between the high and low points is traveling toward the pull back element.

7. In a tufting machine, tufting mechanism including a plurality of reciprocatory needles having eyes adapted to receive threads, a plurality of reciprocatory loopers coacting with the needles, means to drive the needles and loopers, means for engaging the threads and feeding the same in prescribed lengths to the needles during the operation of the machine, means for engaging the portions of the threads passing from the thread feeding means to the needles to pull back upon such portions when the needles move rearwardly and to pay out such portions when the needles move forwardly, a plurality of pull back elements for engaging said portions of the threads, a rotary member, cams to move the pull back elements, means to circumferentially adjustably mount the cams upon the member, and means to drive the member.

8. In a tufting machine, tufting mechanism comprising a plurality of reciprocatory needles having eyes adapted to receive threads, a plurality of reciprocatory loopers to coact with the needles, means to drive the needles and loopers, means for engaging the threads and feeding prescribed lengths of the same to the needles during the operation of the machine, pull back levers for engaging the portions of the threads passing from the thread feeding means to the needles, a rotary shaft associated with the needles and arranged near the pull back levers, a plurality of cams circumferentially adjustably mounted upon the shaft and serving to move the pull back levers, means to lock the cams upon the shaft in the selected adjusted position, means to drive the shaft, and means for engaging said portions of the threads to pull back upon the same when the needles move rearwardly and to pay out such portions when the needles move forwardly.

9. In a tufting machine, a generally horizontal needle bar, a plurality of needles mounted upon the needle bar and having eyes adapted to receive threads, a plurality of loopers for coaction with the needles, means to drive the needle bar and loopers, work feed means associated with the needles and loopers, means to feed the threads for prescribed lengths to the eyes of the needles during the operation of the machine, means for engaging the portions of the threads passing from the thread feeding means to the needles and to pull back upon the same when the needles move rearwardly and to pay out such portions when the needles move forwardly, pull back elements for engaging said thread portions which lead to selected needles, a drive shaft arranged near the pull back elements, cams mounted upon the drive shaft to operate the pull back elements, and means to alternately automatically drive and stop the drive shaft.

10. In a tufting machine, tufting mechanism including a reciprocatory needle having an eye adapted to receive a thread, means for supplying the thread in prescribed lengths to the eye of the needle, a pull back element for engaging the thread, means for engaging the thread to pull back upon the same when the needle moves rearwardly and to pay out the same when the needle moves forwardly, a cam arranged near the pull back element to operate it, a spring to urge the pull back element toward the cam, and adjustable means to hold the pull back element spaced from the cam so that it cannot be operated by the cam.

11. In a tufting machine, tufting mechanism including a reciprocatory needle having an eye adapted to receive a thread, means for supplying the thread in prescribed lengths to the eye of the needle, a pull back element for engaging the thread, means for engaging the thread to pull back upon the same when the needle moves rearwardly and to pay out the same when the needle moves forwardly, a cam arranged to move the pull back element, and an adjustable element to hold the pull back element out of the path of travel of the cam.

12. In a tufting machine, tufting mechanism including a plurality of reciprocatory needles having eyes adapted to receive threads, means for continuously operating the needles, means for feeding prescribed lengths of the threads to the eyes of the needles, pull back elements for engaging the threads, means separate from the pull back elements to pull back upon the threads when the needles move rearwardly and to pay out the threads when the needles move forwardly, cams arranged near the pull back elements to operate them, and means to move the high parts of certain cams in one direction and simultaneously move the high parts of other cams in an opposite direction.

13. In a tufting machine, tufting mechanism including work feed means and reciprocatory needles having eyes adapted to receive threads, means for feeding prescribed lengths of threads to the needles, pull back elements for engaging the threads passing to the eyes of the needles, means for engaging such threads to pull back upon the same when the needles move rearwardly and to pay out the threads when the needles move forwardly, and means to simultaneously move selected pull back elements in one direction and other selected pull back elements in an opposite direction.

14. In a tufting machine, tufting mechanism including a reciprocatory needle having an eye adapted to receive a thread, means for engaging the thread to feed prescribed lengths of the threads to the eye of the needle, means for engaging that portion of the thread passing from the thread feeding means to the needle and to pull back upon the same when the needle moves rearwardly and to pay out the same when the needle moves forwardly, and means separate from the first-named pull back means to pull back the thread in one direction.

15. In a tufting machine, tufting mechanism including a plurality of reciprocatory needles having eyes adapted to receive threads, means for engaging the threads and feeding the same in prescribed lengths to the eyes of the needles, means for engaging the portions of the threads passing from the thread feeding means to the eyes of the needles to pull back upon the threads when the needles are moved rearwardly and to pay out the same when the needles are moved forwardly, a plurality of movable elements for engaging the said portions of the threads and movable in one direction to pull back upon the threads and in an opposite direction to pay out the threads, a rotary member, operating elements mounted upon the rotary member for controlling the movements of said movable elements, and means to circumferentially adjustably mount the operating elements upon the rotary member.

16. In a tufting machine, tufting mechanism including a plurality of reciprocatory needles having eyes adapted to receive threads, means for engaging the threads and feeding prescribed lengths of the threads to the eyes of the needles, means for engaging the portions of the threads passing from the thread feeding means to the eyes of the needles to pull back upon the threads when the needles move rearwardly and to pay out the same when the needles move forwardly, a plurality of movable elements for engaging the threads, operating elements engaging the movable elements and controlling their movements in opposite directions, and means to drive the operating elements so that they shift certain of the movable elements in one direction at one time and other movable elements in the same direction at a different time.

17. In a tufting machine, tufting mechanism including a plurality of reciprocatory needles having eyes adapted to receive threads, means for engaging the threads and feeding prescribed lengths of the threads to the eyes of the needles, means for engaging the portions of the threads passing from the thread feeding means to the eyes of the needles to pull back upon the threads when the needles move rearwardly and to pay out the same when the needles move forwardly, a plurality of movable elements for engaging said portions of the threads and movable in one direction to pull back upon the threads and in an opposite direction to pay out the threads, a rotary member, operating elements mounted upon the rotary member to control the movements of the movable elements, each operating element having high and low points, certain of the operating elements having their high points circumferentially spaced from the high points of other operating elements, and means to drive the rotary member.

18. In a tufting machine, work feed means for supporting and advancing a fabric backing, a needle bar extending transversely of the direction of feed of the fabric backing and arranged opposite to the same, a plurality of needles mounted upon the needle bar in spaced relation and having eyes adapted to receive threads, means to reciprocate the needle bar, means for engaging the threads and feeding prescribed lengths of the threads to the eyes of the needles, groups of movable elements for engaging the portions of the threads passing from the thread feeding means to the eyes of the needles, means coacting with the groups of movable elements to shift one group in one direction while shifting another group in an opposite direction, and means for engaging said portions of the threads to pull back upon the threads when the needles move rearwardly and to pay out the threads when the needles move forwardly.

19. In a tufting machine, work feed means for supporting and advancing a fabric backing, a needle bar extending transversely of the direction of feed of the fabric backing and arranged opposite to the same, a plurality of needles mounted upon the needle bar and having eyes adapted to receive threads, means for engaging the threads and feeding prescribed lengths of threads to the eyes of the needles, means for engaging the portions of the threads passing from the thread feeding means to the eyes of the needles to pull back upon the threads when the needles move rearwardly and to pay out the same when the needles move forwardly, pull back and paying out means having a plurality of openings for receiving said portions of certain threads, second pull back and paying out means having a plurality of openings for receiving said portions of other threads, the two pull back and paying out means extending longitudinally of the needle bar, and automatic means coacting with the first pull back and paying out means and the second pull back and paying out means to simultaneously shift the same in opposite directions.

20. In a tufting machine, work feed means for supporting and advancing a fabric backing, a needle bar extending transversely of the direction of feed of the fabric backing and arranged opposite to the same, a plurality of spaced needles mounted upon the needle bar and having eyes adapted to receive threads, the needles near the ends of the needle bar serving to sew loops in the side borders of the fabric backing while the intermediate needles serving to sew loops in the field of the fabric backing, means to reciprocate the needle bar, means for feeding prescribed lengths of threads to all of the needles, means for engaging the portions of the threads passing from the thread feeding means to the eyes of the needles to pull back upon the threads when the needles move rearwardly and to pay out the same when the needles move forwardly, movable pull back and paying out elements for engaging the said portions of the threads only which pass to the intermediate needles, a drive shaft, means to operate the pull back and paying out elements including elements mounted upon the drive shaft, and means separate from the needle bar to operate the drive shaft and to stop the drive shaft while the needle bar is reciprocated.

21. In a tufting machine, tufting mechanism including a plurality of reciprocatory needles having eyes adapted to receive threads, a plurality of loopers to coact with the needles, thread guide means for engaging the threads held in the eyes of the needles, means for feeding prescribed lengths of threads to the needles, means for engaging portions of the threads which pass from the thread guide means to the needles to pull back upon such portions when the needles move rearwardly and to pay out such portions when the needles move forwardly, pull back levers for engaging said portions of the threads, a rotary shaft associated with the needles and arranged near the pull back levers, a plurality of cams mounted upon the shaft and circumferentially adjustable thereon and serving to move the pull back levers, means to drive the shaft, and means to hold selected pull back levers in positions remote from the corresponding cams so that the cams cannot move such levers.

22. In a tufting machine, a generally horizontal needle bar, a plurality of needles mounted upon the needle bar and having eyes adapted to receive threads and arranged in a longitudinal group, the needles near the ends of the longitudinal group serving to sew loops in the side borders of the tufted product while the intermediate needles serving to sew loops in the field of the tufted product, means for feeding prescribed lengths of threads to the needles, means for engaging the portions of the threads which pass from the thread feeding means to the needles to pull back upon such portions when the needles move rearwardly and to pay out such portions when the needles move forwardly, means for separating the threads into side border groups and an intermediate field group, pull back means for engaging said portions of the intermediate thread field group, and means to render the pull back means active and inactive.

23. In a tufting machine, a generally horizontal needle bar, a plurality of needles mounted upon the needle bar and having eyes adapted to receive threads and arranged in a longitudinal group, the needles near the ends of the longitudinal group serving to sew loops in the side borders of the tufted product while the intermediate needles serving to sew loops in the field of the tufted product, a plurality of loopers corresponding in number and arrangement to the needles, means for feeding prescribed lengths of threads to the needles, means for engaging the portions of the threads passing from the thread feeding means to the needles to pull back on the threads when the needles move rearwardly and to pay out such portions when the needles move forwardly, pull back elements for engaging the threads which lead to the intermediate group of needles only, means for continuously reciprocating the needles and loopers during the operation of the machine, a drive shaft, cams mounted upon the drive shaft and serving to operate the pull back elements, and means to rotate and stop the drive shaft, the last-named means including a cam disc having high and low parts and a member to engage the high and low parts, said last-named means rotating the drive shaft when the member engages the high part and stopping the drive shaft when the member engages the low part.

24. In a tufting machine, a generally horizontal needle bar, a plurality of needles mounted upon the needle bar and having eyes adapted to receive threads, a plurality of loopers associated with the needles, work feed means arranged near the needles, means for feeding prescribed lengths of threads to the needles, means for engaging portions of the threads which pass from the thread feeding means to the needles and to pull back upon such portions when the needles move rearwardly and to pay out such portions when the needles move forwardly, pull back elements for engaging said portions of the threads passing to the needles, means for continuously driving the needle bar and loopers during the operation of the machine, a drive shaft, cams mounted upon the drive shaft and arranged to operate the pull back elements, driving means connected with said shaft, and means to render the driving means active and inactive including a rotary cam disc having high and low parts and a member to engage the high and low parts, and means to vary the length of the high and low parts.

25. In a tufting machine, tufting mechanism including a plurality of reciprocatory needles having eyes for receiving threads, means for engaging the threads and feeding prescribed lengths of the threads to the eyes of the needles, means for engaging portions of the threads passing from the thread feeding means to the eyes of the needles to pull back upon the threads when the needles move rearwardly and to pay out the threads when the needles move forwardly, rock shafts, a set of pull back elements for engaging selected threads and mounted upon one rock shaft, a set of pull back elements to engage other selected threads and mounted upon the other rock shaft, and means to turn the rock shafts in opposite directions.

References Cited in the file of this patent

UNITED STATES PATENTS

| | | |
|---|---|---|
| 676,387 | Kustner | June 11, 1901 |
| 1,141,217 | Solaini | June 1, 1915 |
| 1,831,485 | Dykeman | Nov. 10, 1931 |
| 1,863,049 | Hermann | June 14, 1932 |
| 2,337,529 | Tanis et al. | Dec. 21, 1943 |
| 2,411,268 | Hamrick | Nov. 19, 1946 |

FOREIGN PATENTS

| | | |
|---|---|---|
| 435,631 | France | Dec. 30, 1911 |